US012627975B2

(12) United States Patent
Kumari et al.

(10) Patent No.: US 12,627,975 B2
(45) Date of Patent: May 12, 2026

(54) BI-STATIC SENSING CHARGING SUBSCRIPTION

(71) Applicant: QUALCOMM Incorporated, San Diego, CA (US)

(72) Inventors: Preeti Kumari, San Diego, CA (US); Hong Cheng, Basking Ridge, NJ (US); Kapil Gulati, Belle Mead, NJ (US); Shuanshuan Wu, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 543 days.

(21) Appl. No.: 18/163,044

(22) Filed: Feb. 1, 2023

(65) Prior Publication Data

US 2024/0259789 A1    Aug. 1, 2024

(51) Int. Cl.
| | |
|---|---|
| *H04W 8/24* | (2009.01) |
| *G01S 13/00* | (2006.01) |
| *H04W 4/24* | (2024.01) |
| *H04W 36/00* | (2009.01) |

(52) U.S. Cl.
CPC ............... *H04W 8/24* (2013.01); *H04W 4/24* (2013.01); *H04W 36/0055* (2013.01); *G01S 13/003* (2013.01)

(58) Field of Classification Search
CPC ......... G01S 13/003; H04W 8/24; H04W 4/24; H04W 36/0055
See application file for complete search history.

(56) References Cited

U.S. PATENT DOCUMENTS

| | | | |
|---|---|---|---|
| 8,375,205 | B2 | 2/2013 | Johnston |
| 10,298,344 | B1 | 5/2019 | Devineni et al. |
| 2006/0078001 | A1 | 4/2006 | Chandra et al. |
| 2014/0009307 | A1* | 1/2014 | Bowers ................. G08G 1/166 340/901 |
| 2014/0012492 | A1* | 1/2014 | Bowers ................... G08G 1/16 701/301 |
| 2020/0287993 | A1 | 9/2020 | Schweizer |
| 2020/0351712 | A1 | 11/2020 | Kim |

(Continued)

FOREIGN PATENT DOCUMENTS

WO    WO-2013028777 A2    2/2013

OTHER PUBLICATIONS

International Search Report and Written Opinion—PCT/US2023/082487—ISA/EPO—Apr. 18, 2024.

(Continued)

*Primary Examiner* — Margaret G Webb
(74) *Attorney, Agent, or Firm* — Norton Rose Fulbright US LLP

(57)    ABSTRACT

This disclosure provides systems, methods, and devices for wireless communication that support a sensing charging subscription. In a first aspect, a method of wireless communication includes transmitting a request to a network entity to participate in a bi-static sensing operation. The method also includes performing the bi-static sensing operation with the network entity. The method further includes transmitting transmit sensing information associated with the bi-static sensing operation. The charging information is associated with sensing charging subscription information. Other aspects and features are also claimed and described.

30 Claims, 8 Drawing Sheets

(56)                    References Cited

U.S. PATENT DOCUMENTS

| | | |
|---|---|---|
| 2022/0104111 A1 | 3/2022 | Zorgui et al. |
| 2022/0155435 A1 | 5/2022 | Bayesteh et al. |
| 2022/0236394 A1 | 7/2022 | Nam et al. |
| 2023/0049552 A1 | 2/2023 | Chitrakar et al. |
| 2023/0288554 A1* | 9/2023 | Sjöland .................. G01S 13/87 |
| 2023/0362898 A1* | 11/2023 | Jeon ..................... G01S 7/0235 |
| 2025/0175828 A1* | 5/2025 | Zhu ...................... H04W 24/08 |

OTHER PUBLICATIONS

International Search Report and Written Opinion—PCT/US2024/015525—ISA/EPO—Apr. 12, 2024.
Partial International Search Report—PCT/US2023/082487—ISA/EPO—Feb. 16, 2024.
Sultan A., et al.,(3GPP): "TR 22.837v0.3.0 Study on Integrated Sensing and Communication", S1-223740, Type Draft TR,_ FS_Sensing, 3rd Generation Partnership Project, Mobile Competence Centre, 650, Route Des Lucioles, F-06921 Sophia-Antipolis Cedex, France, vol. 3GPP SA 1, No. Toulouse, FR, Nov. 14, 2022-Nov. 18, 2022, Dec. 2, 2022, pp. 1-72, XP052230292, the whole document.

* cited by examiner

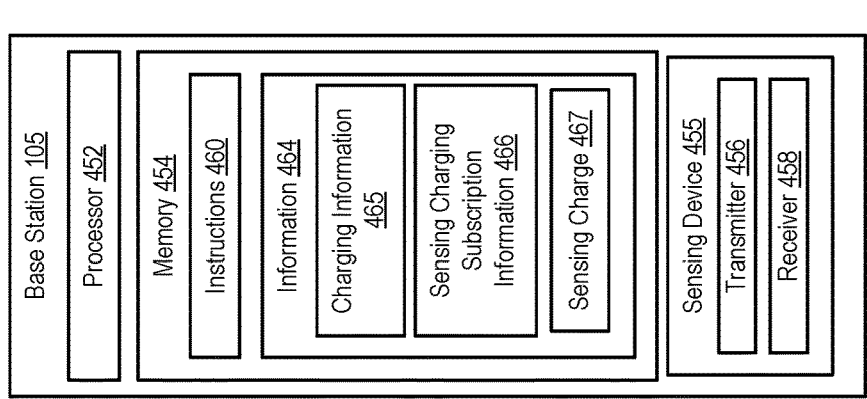
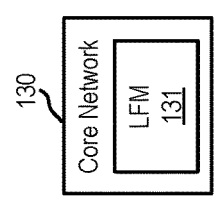
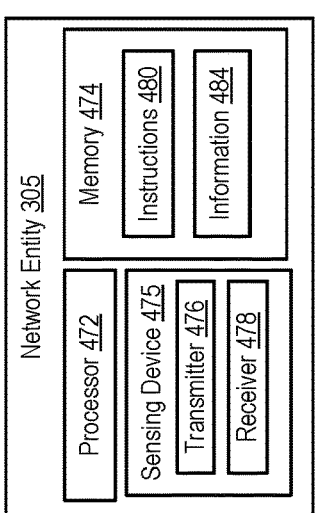
FIGURE 4

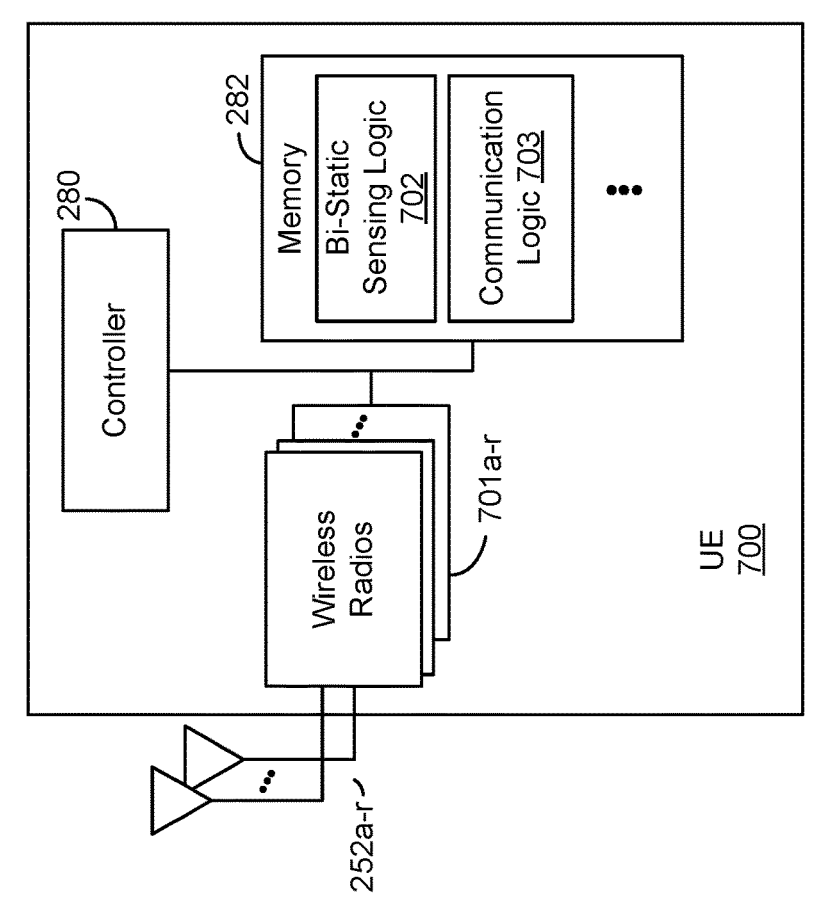

*FIGURE 7*

Wireless Radios 701a-r

Controller 280

Memory 282

Bi-Static Sensing Logic 702

Communication Logic 703

...

252a-r

UE 700

600

602 Transmit a request to a network entity to participate in a bi-static sensing operation 604 Perform the bi-static sensing operation with the network entity 606 Transmit transmit sensing information associated with the bi-static sensing operation, the transmit sensing information associated with sensing charging subscription information

*FIGURE 6*

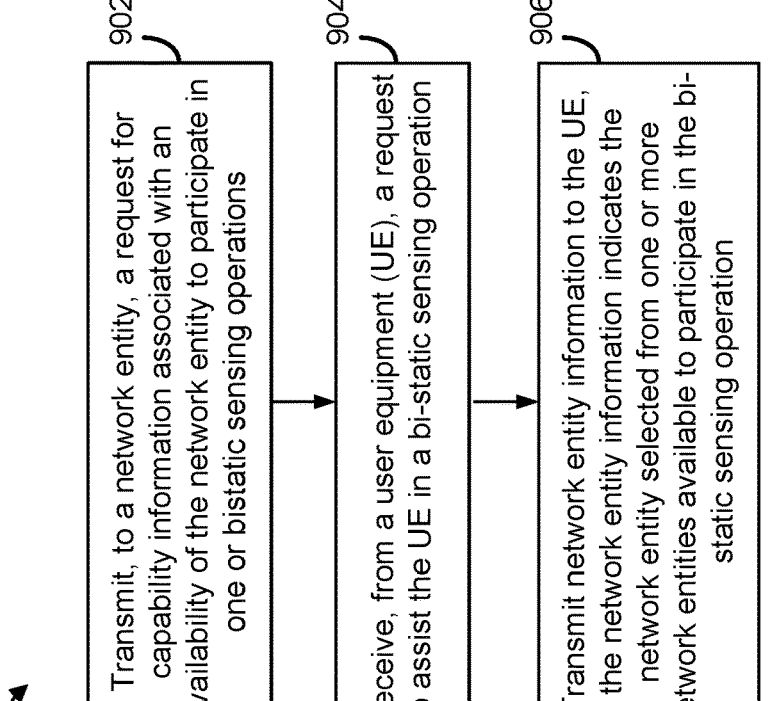

900

902

Transmit, to a network entity, a request for capability information associated with an availability of the network entity to participate in one or bistatic sensing operations

904

Receive, from a user equipment (UE), a request to assist the UE in a bi-static sensing operation

906

Transmit network entity information to the UE, the network entity information indicates the network entity selected from one or more network entities available to participate in the bi-static sensing operation

FIGURE 9

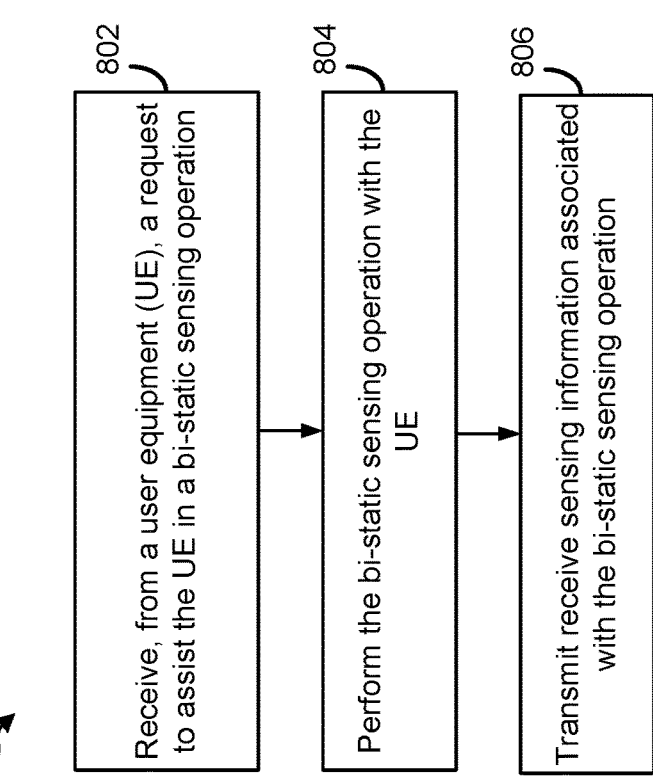

800

802

Receive, from a user equipment (UE), a request to assist the UE in a bi-static sensing operation

804

Perform the bi-static sensing operation with the UE

806

Transmit receive sensing information associated with the bi-static sensing operation

FIGURE 8

BI-STATIC SENSING CHARGING SUBSCRIPTION

TECHNICAL FIELD

Aspects of the present disclosure relate generally to wireless communication systems, and more particularly, to a sensing charging subscription, such as a sensing charging subscription associated with a bi-static sensing operation. Some features may enable and provide sensing operation management and control, reduced overhead signaling, efficient spectrum usage, reduced device hardware, or a combination thereof.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

Conventional 3GPP systems are configured to manage communication-based subscription charges, such as communication charges for NR communication. To illustrate, a 3GPP system may use or implement online charging, which is a mechanism where charging information can affect, in real-time, the service rendered. The online charging for communication-based subscriptions may be event-based or session-based. To implement the online charging, a direct interaction between the charging mechanism and control of network resource usage. Although the 3GPP systems are configured to manage the communication-based subscription charges, the 3GPP systems are not configured to manage and charge for sensing services, such as long range or short-range sensing, that may be offered over 5G.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication is performed by a user equipment (UE). The method includes transmitting a request to a network entity to participate in a bi-static sensing operation. The method further includes performing the bi-static sensing operation with the network entity. The method also includes transmitting transmit sensing information associated with the bi-static sensing operation. The transmit sensing information is associated with sensing charging subscription information.

In an additional aspect of the disclosure, an apparatus includes at least one processor and a memory coupled to the at least one processor. The at least one processor is configured to transmit a request to a network entity to participate in a bi-static sensing operation. The at least one processor is further configured to perform the bi-static sensing operation with the network entity. The at least one processor is also configured to transmit transmit sensing information associated with the bi-static sensing operation. The transmit sensing information is associated with sensing charging subscription information.

In an additional aspect of the disclosure, an apparatus includes means transmitting a request to a network entity to participate in a bi-static sensing operation. The apparatus further includes means for performing the bi-static sensing operation with the network entity. The apparatus also includes means for transmitting transmit sensing information associated with the bi-static sensing operation. The transmit sensing information is associated with sensing charging subscription information.

In an additional aspect of the disclosure, a non-transitory computer-readable medium stores instructions that, when executed by a processor, cause the processor to perform operations. The operations include transmitting a request to a network entity to participate in a bi-static sensing operation. The operations further include performing the bi-static sensing operation with the network entity. The operations also include transmitting transmit sensing information associated with the bi-static sensing operation. The transmit sensing information is associated with sensing charging subscription information.

In one aspect of the disclosure, a method for wireless communication is performed by a network entity. The method includes receiving, from a UE, a request to assist the UE in a bi-static sensing operation. The method further includes performing the bi-static sensing operation with the U. The method also includes transmitting receive sensing information associated with the bi-static sensing operation.

In an additional aspect of the disclosure, an apparatus includes at least one processor and a memory coupled to the at least one processor. The at least one processor is configured to receive, from a UE, a request to assist the UE in a bi-static sensing operation. The at least one processor is further configured to perform the bi-static sensing operation with the U. The at least one processor is also configured to transmit receive sensing information associated with the bi-static sensing operation.

In an additional aspect of the disclosure, an apparatus includes means for receiving, from a UE, a request to assist the UE in a bi-static sensing operation. The apparatus further includes means for performing the bi-static sensing operation with the U. The apparatus also includes means for transmitting receive sensing information associated with the bi-static sensing operation.

In an additional aspect of the disclosure, a non-transitory computer-readable medium stores instructions that, when executed by a processor, cause the processor to perform operations. The operations include receiving, from a UE, a request to assist the UE in a bi-static sensing operation. The operations further include performing the bi-static sensing operation with the U. The operations also include transmitting receive sensing information associated with the bi-static sensing operation.

In one aspect of the disclosure, a method for wireless communication is performed by a network. The method includes transmitting, to a network entity, a request for capability information associated with an availability of the network entity to participate in one or more bistatic sensing operations. The method further includes receiving, from a UE, a request to assist the UE in a bi-static sensing operation. The method also includes transmitting network entity information to the UE. The network entity information indicates the network entity selected from one or more network entities available to participate in the bi-static sensing operation.

In an additional aspect of the disclosure, an apparatus includes at least one processor and a memory coupled to the at least one processor. The at least one processor is configured to transmit, to a network entity, a request for capability information associated with an availability of the network entity to participate in one or more bistatic sensing operations. The at least one processor is further configured to receive, from a UE, a request to assist the UE in a bi-static sensing operation. The at least one processor is also configured to transmit network entity information to the UE. The network entity information indicates the network entity selected from one or more network entities available to participate in the bi-static sensing operation.

In an additional aspect of the disclosure, an apparatus includes means for transmitting, to a network entity, a request for capability information associated with an availability of the network entity to participate in one or more bistatic sensing operations. The apparatus further includes means for receiving, from a UE, a request to assist the UE in a bi-static sensing operation. The apparatus also includes means for transmitting network entity information to the UE. The network entity information indicates the network entity selected from one or more network entities available to participate in the bi-static sensing operation.

In an additional aspect of the disclosure, a non-transitory computer-readable medium stores instructions that, when executed by a processor, cause the processor to perform operations. The operations include transmitting, to a network entity, a request for capability information associated with an availability of the network entity to participate in one or more bistatic sensing operations. The operations further include receiving, from a UE, a request to assist the UE in a bi-static sensing operation. The operations also include transmitting network entity information to the UE. The network entity information indicates the network entity selected from one or more network entities available to participate in the bi-static sensing operation.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 4 is a block diagram illustrating an example wireless communication system that supports a sensing charging subscription according to one or more aspects.

FIG. 6 is a flow diagram illustrating an example process that supports a sensing charging subscription according to one or more aspects.

FIG. 7 is a block diagram of an example UE that supports a sensing charging subscription according to one or more aspects.

FIG. 8 is a flow diagram illustrating an example process that supports a sensing charging subscription according to one or more aspects.

FIG. 9 is a flow diagram illustrating an example process that supports a sensing charging subscription according to one or more aspects.

Like reference numbers and designations in the various drawings indicate like elements.

DETAILED DESCRIPTION

Figure 1:
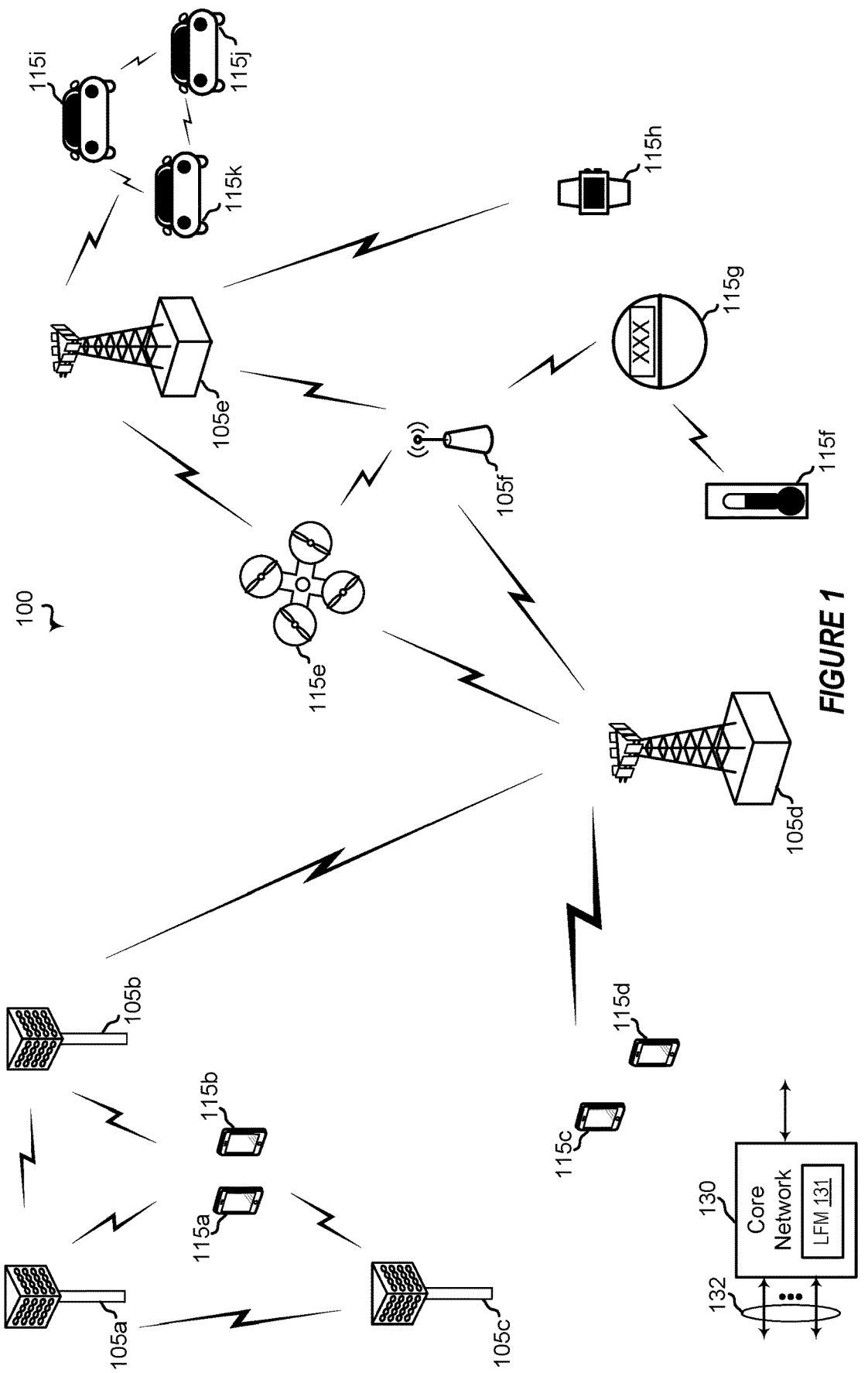
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support a sensing charging subscription or a bi-static sensing operation. For example, the present disclosure describes sensing charging subscription information that is associated with a sensing charging subscription for a user equipment (UE) configured to perform a sensing operation, such as bi-static sensing. To illustrate, the UE may initiate a sensing operation, such as a bi-static sensing operation, that is performed with the assistance of a network entity, such as a base station, another UE, a roadside unit (RSU), or another device. In some implementations, a network (e.g., a centralized controller or core network) is configured to determine a fee for a sensing service or a sensing operations, and to assist the UE to perform the sensing operation. To illustrate, the network may be configured to determine the fee based on a bi-static sensing measurement information, a resource available at the network entity for the bi-static sensing operation, a resource needed by the UE for the bi-static sensing operation, a location of the UE, a mobility of the UE, a location of the network entity, a mobility of the network entity, a distance between the UE and the network entity, an operational mode at the network entity, a pre-sensing operation, a pre-sensing measurement report, or a combination thereof. Additionally, the network may be configured to identify one or more network entities that are suitable or available to perform the sensing operation with the UE. For example, the network may identify the one or more network entities based on a location of the network entity, a location of the UE, capability information received from the network entity, a fee for use of the network entity, sensing charging subscription information associated with the UE, a quality of service requested by the UE, an available quality of service associated with the network entity, or a combination thereof. As another example, the network may communicate or negotiate with the UE to determine a sensing resource, a sensing transmission parameter, a sensing fee, or a combination thereof. In some implementations, the UE may perform a pre-sensing operation with one or more network entities to select the network entity to perform the bi-static sensing operation with. In some implementations, the network entity, the network, or both, may perform a handover to further assist (or to continue to assist) the UE with performing the sensing operation, such as the bi-static sensing operation.

Particular implementations of the subject matter described in this disclosure may be implemented to realize one or more of the following potential advantages or benefits. In some aspects, the present disclosure provides techniques for supporting a sensing charging subscription. For example, the techniques described provide techniques, information, and signaling for the UE to perform sensing operations according to a sensing subscription. A system, such as a 3GPP system may advantageously manage sensing based subscription charges for the sensing operations or services, such as 5G or NR sensing services, associated with the UE. The techniques described herein enable reduced overhead, efficient spectrum usage, improved spectrum reuse, reduced device hardware, improved hardware reuse, or a combination thereof.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5$^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Base stations 105 may communicate with a core network 130 and with one another. For example, base stations 105 may interface with the core network 130 through backhaul links 132 (e.g., via an S1, N2, N3, or other interface). Base stations 105 may communicate with one another over backhaul links (e.g., via an X2, Xn, or other interface) either directly (e.g., directly between base stations 105) or indirectly (e.g., via core network 130).

Core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

In some implementations, core network 130 includes or is coupled to a Location Management Function (LMF) 131, which is an entity in the 5G Core Network (5GC) supporting various functionality, such as managing support for different location services for one or more UEs. For example the LMF 131 may include one or more servers, such as multiple distributed servers. Base stations 105 may forward location messages to the LMF 131 and may communicate with the LMF via a NR Positioning Protocol A (NRPPa). The LMF 131 is configured to control the positioning parameters for UEs 115 and the LMF 131 can provide information to the base stations 105 and UE 115 so that action can be taken at UE 115. In some implementations, UE 115 and base station 105 are configured to communicate with the LMF 131 via an Access and Mobility Management Function (AMF).

Figure 2:
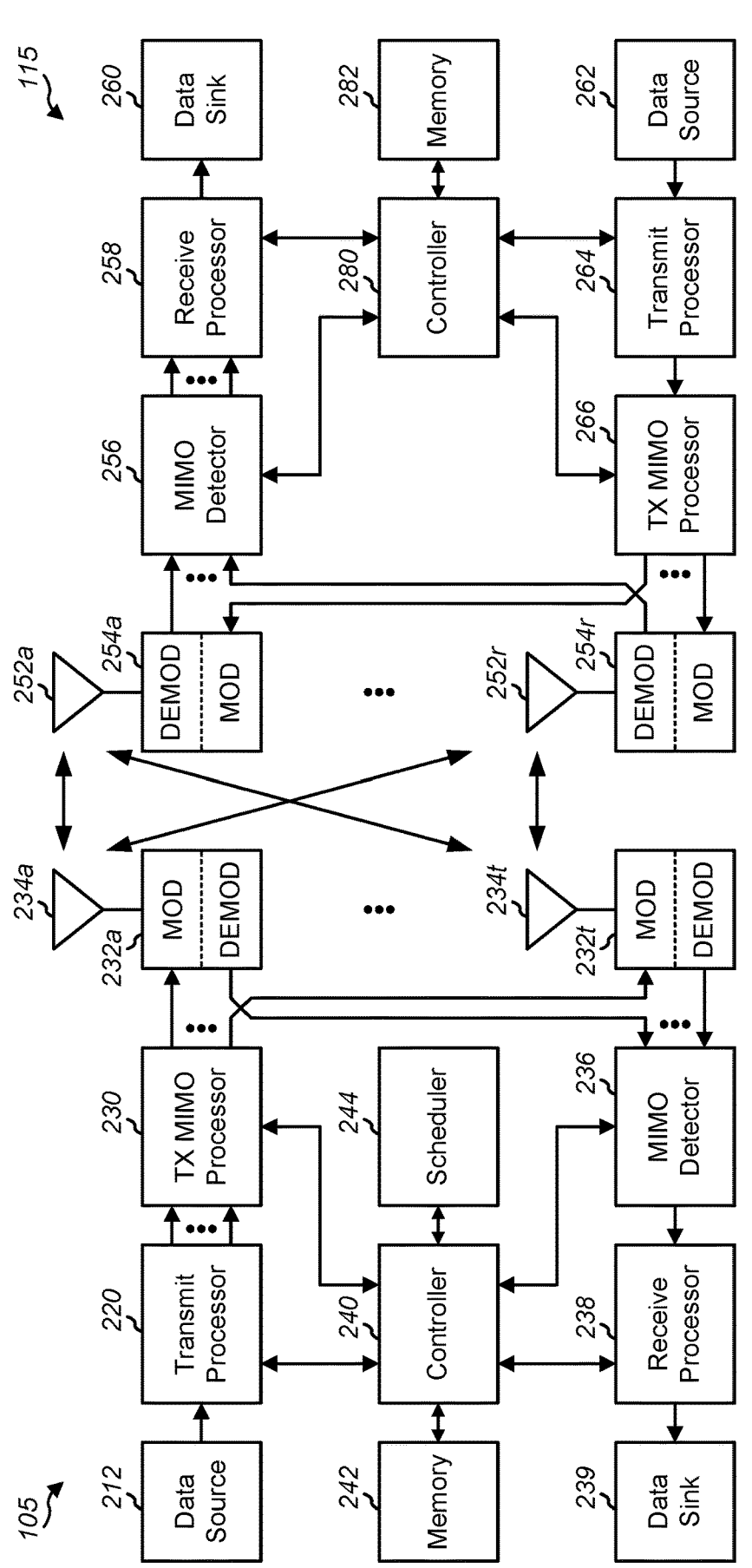
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in or described with reference to FIGS. 1-10, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Figure 3:
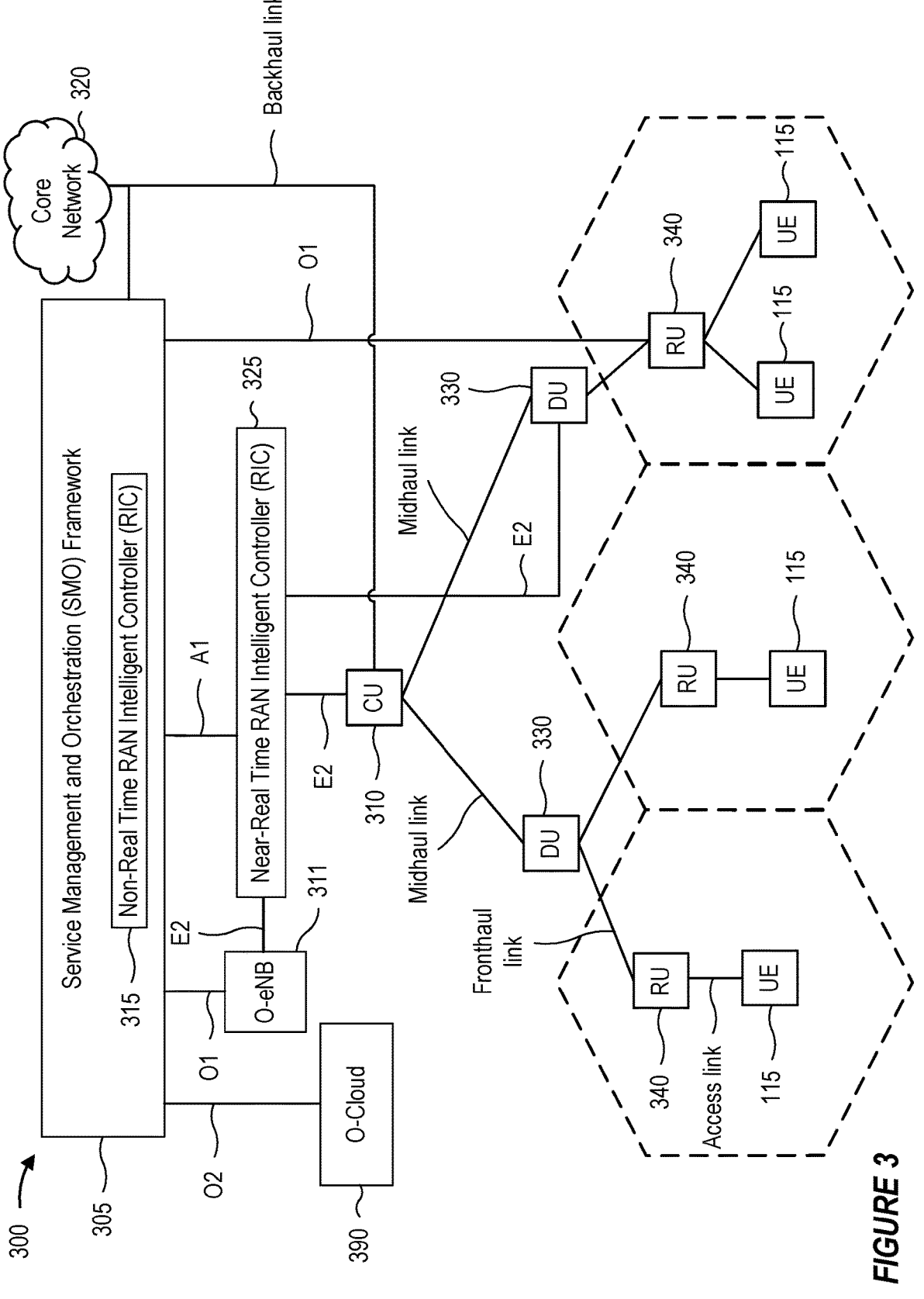
FIG. 3 shows a diagram illustrating an example disaggregated base station architecture according to one or more aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). Core network 320 may include or correspond to core network 130. A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 115 via one or more radio frequency (RF) access links. In some implementations, the UE 115 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 115. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As described herein, a node (which may be referred to as a node, a network node, a network entity, or a wireless node) may include, be, or be included in (e.g., be a component of) a base station (e.g., any base station described herein), a transmission and reception point (TRP), a UE (e.g., any UE described herein), a network controller, an apparatus, a device, a computing system, an integrated access and backhauling (IAB) node, a distributed unit (DU), a central unit (CU), a remote unit (RU), a core network, a LFM, and/or a another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

FIG. 4 is a block diagram of an example wireless communications system 400 that supports a sensing charging subscription according to one or more aspects. In some examples, wireless communications system 400 may implement aspects of wireless network 100. Wireless communications system 400 includes UE 115, base station 105, core network 130, and a network entity 470. In some implementations, base station 105 and core network 130 may be individually or collectively referred to as a network, a network device, or a network system. Although one UE 115, one base station 105, and one network entity 470 are illustrated, in some other implementations, wireless communications system 400 may generally include multiple UEs 115, multiple base station 105, multiple network entities 470, or a combination thereof.

In some implementations, wireless communications system 400 includes an object 490, such as a stationary object or a mobile object. Object 490 may be sensed by a device, such as UE 115, network entity 470, base station 105, or a combination thereof, based on one or more sensing operations. The one or more sensing operations may include a monostatic sensing operation or a bi-static sensing operation, as illustrative, non-limiting examples. In some implementations, the one or more sensing operations may be performed to detect object 490, determine a location of object 490, or a combination thereof.

UE 115 may include a device, such as a mobile device or a vehicle. UE 115 may be configured to performing sensing using one or more uplink (UL) resources. For example, sensing may include bi-static sensing or monostatic sensing. When UE 115 is a vehicle, UE 115 may perform one or more sensing operations to sense an environment, such as an indoor environment of the vehicle or an outdoor environment of the vehicle. To illustrate, UE 115 may sense for surrounding objects for automotive applications, such as collision avoidance. To enable UE side sensing, such as a joint communication and radar (JCR) sensing, the UL resources (e.g., communication resources) can be reused for sensing. For example, the UL resources may be shared between communication and radar modes. To illustrate, in some implementations, there could be separate resources for communication or radar that are used based on a TDM mode. In some such implementations, an SRS can be utilized as a sensing waveform. Alternatively, the same resource for communication and radar may be used that has a join co-design waveform.

UE 115 may include a variety of components (such as structural, hardware components) used for carrying out one or more functions described herein. For example, these components may include one or more processors 402 (hereinafter referred to collectively as "processor 402"), one or more memory devices 404 (hereinafter referred to collectively as "memory 404"), and one or more sensing devices 415 (hereinafter referred to collectively as "sensing device 415"). Sensing device 415 may include or correspond to a bi-static sensing device. In some implementations, UE 115 may include an interface (e.g., a communication interface) that includes transmitter 416, receiver 418, or a combination thereof. Processor 402 may be configured to execute instructions 405 stored in memory 404 to perform the operations described herein. In some implementations, processor 402 includes or corresponds to one or more of receive processor 258, transmit processor 264, and controller 280, and memory 404 includes or corresponds to memory 282.

Memory 404 includes or is configured to store instructions 405 and information 406. Information 406 may include capability information 408, sensing charging subscription information 409, and measurement information 410. Capability information 408 may include or indicate one or more capabilities of UE 115 associated with performing a bi-static sensing operation. For example, capability information 408 may include or indicate whether UE 115 is configured to function as a transmit (Tx) device or a receive (Rx) device for the bi-static sensing operation. Additionally, or alternatively, capability information 408 may include or indicate a time domain parameter, a frequency domain parameter, a beam direction, a beam bandwidth, a transmission power, a quality of service, or a combination thereof, associated with the bi-static sensing operation. Sensing charging subscription information 409 may include or indicate a sensing subscription associated with one or more sensing operations or one or more sensing services. The sensing subscription may include or indicate a functionality, a rule, a profile, a model, a charge fee, or a combination thereof. In some implementations, the sensing subscription is associated with or based on an agreement, such as a contract, that identifies or defines the sensing subscription of multiple available sensing subscriptions.

Measurement information 410 may include or indicate information based on a pre-sensing operation, the bi-static sensing operation, or a combination thereof. Measurement information 410 may include information generated by UE 115, network entity 470, another network entity, or a combination thereof. In some implementations, measurement information 410 includes a pre-sensing measurement report, a transmit sensing information (associated with a Tx device of a bi-static sensing operation), a receive sensing information (associated with an Rx device of a bi-static sensing operation), one or more parameters associated with a pre-sensing operation or a bi-static sensing operation, or a combination thereof. The transmit sensing report may include or indicate completion of the bi-static sensing operation, the receive sensing information, the network entity, a time domain parameter, a frequency domain parameter, a beam direction, a beam bandwidth, a transmission power, a quality of service, or a combination thereof. The receive sensing information may include or indicate a received signal strength, a time domain parameter, a time travel time, a beam direction, a beam bandwidth, a quality of service, a location of an objection, or a combination thereof.

Sensing device 415 may be configured to be used in a bi-static sensing operation. Sensing device 415 includes one or more transmitters 416 (hereinafter referred to collectively as "transmitter 416"), and one or more receivers 418 (hereinafter referred to collectively as "receiver 418"). Transmitter 416 is configured to transmit reference signals, control information and data to one or more other devices, and receiver 418 is configured to receive references signals, synchronization signals, control information and data from one or more other devices. For example, transmitter 416 may transmit signaling, control information and data to, and receiver 418 may receive signaling, control information and data from, base station 105. In some implementations, transmitter 416 and receiver 418 may be integrated in one or more transceivers. Additionally or alternatively, transmitter 416 or receiver 418 may include or correspond to one or more components of UE 115 described with reference to FIG. 2. In some implementations, sensing device 415 is associated with a joint communication and radar (JCR) system. The JCR system may be categorized as a cooperative JCR system or a co-design of communication and radar systems. For example, sensing device 415 may be associated with the co-design of communication and radar systems. Although described as including both transmitter 416 and receiver 418, in other implementations, sensing device 415 may include transmitter 416 but not receiver 418, or may include receiver 418 but not transmitter 416.

In some implementations, UE 115 may include one or more antenna arrays. The one or more antenna arrays may be coupled to transmitter 416, receiver 418, or a communication interface. The antenna array may include multiple antenna elements configured to perform wireless communications with other devices, such as with the base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the UE 115. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

UE 115 may include one or more components as described herein with reference to UE 115. In some implementations, UE 115 is a 5G-capable UE, a 6G-capable UE, or a combination thereof.

Network entity 470 may include a device, such as a base station, a roadside unit, a node, or another UE. Network entity 470 may be a mobile device or a stationary device. Network entity 470 may include a variety of components (such as structural, hardware components) used for carrying out one or more functions described herein. For example, these components may include one or more processors 472 (hereinafter referred to collectively as "processor 472"), one or more memory devices 474 (hereinafter referred to collectively as "memory 474"), and one or more sensing devices 475 (hereinafter referred to collectively as "sensing device 475"). Sensing device 475 may include or correspond to a bi-static sensing device. In some implementations, network entity 470 may include an interface (e.g., a communication interface) that includes transmitter 476, receiver 478, or a combination thereof. Processor 472 may be configured to execute instructions 480 stored in memory 474 to perform the operations described herein. In some implementations, processor 472 includes or corresponds to one or more of receive processor 258, transmit processor 264, and controller 280, and memory 474 includes or corresponds to memory 282.

Memory 474 includes or is configured to store instructions 480 and information 484. Information 484 may include or correspond to information 406.

Sensing device 475 may include or correspond to sending device 415. Sensing device 475 may be configured to be used in a bi-static sensing operation. Sensing device 475 includes one or more transmitters 476 (hereinafter referred to collectively as "transmitter 476"), and one or more receivers 478 (hereinafter referred to collectively as "receiver 478"). Transmitter 476 is configured to transmit reference signals, control information and data to one or more other devices, and receiver 478 is configured to receive references signals, synchronization signals, control information and data from one or more other devices. For example, transmitter 476 may transmit signaling, control information and data to, and receiver 478 may receive signaling, control information and data from, base station 105 or UE 115. In some implementations, transmitter 476 and receiver 478 may be integrated in one or more transceivers. Additionally or alternatively, transmitter 476 or receiver 478 may include or correspond to one or more components of UE 115 described with reference to FIG. 2. In some implementations, sensing device 475 is associated with a joint communication and radar (JCR) system. The JCR system may be categorized as a cooperative JCR system or a co-design of communication and radar systems. For example, sensing device 475 may be associated with the co-design of communication and radar systems. Although described as including both transmitter 476 and receiver 478, in other implementations, sensing device 475 may include transmitter 476 but not receiver 478, or may include receiver 478 but not transmitter 476.

In some implementations, network entity 470 may include one or more antenna arrays. The one or more antenna arrays may be coupled to transmitter 476, receiver 478, or a communication interface. The antenna array may include multiple antenna elements configured to perform wireless communications with other devices, such as with UE 115 or base station 105. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of network entity 470. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

Network entity 470 may include one or more components as described herein with reference to UE 115. In some implementations, network entity 470 is a 5G-capable UE, a 6G-capable UE, or a combination thereof.

Base station 105 may include a variety of components (such as structural, hardware components) used for carrying out one or more functions described herein. For example, these components may include one or more processors 452 (hereinafter referred to collectively as "processor 452"), one or more memory devices 454 (hereinafter referred to collectively as "memory 454"), and one or more sensing devices 455 (hereinafter referred to collectively as "sensing device 455"). In some implementations, base station 105 may include an interface (e.g., a communication interface) that includes transmitter 456, receiver 458, or a combination thereof. Processor 452 may be configured to execute instructions 460 stored in memory 454 to perform the operations described herein. In some implementations, processor 452 includes or corresponds to one or more of receive processor 238, transmit processor 220, and controller 240, and memory 454 includes or corresponds to memory 242.

Memory 354 includes or is configured to store instructions 460 and information 464. In some implementations, information 464 may include or correspond to information 406 or 484. Information 464 may include capability information 465, sensing charging subscription information 466, and sensing charge 467. Capability information 465 may include or correspond to capability information 408. Capability information 465 may include or indicate a capability of UE 115, network entity 470, base station 105, or a combination thereof. Sensing charging subscription information 466 may include or correspond sensing charging subscription information 409. Sensing charge subscription information 466 may include or correspond to a subscription, such as a subscription for a sensing service, that is associated with UE 115 or network entity 470. Sensing charge 467 may include or correspond to a charge, such as a fee or a cost, of a sensing service associated with or used by UE 115, network entity 470, or a combination thereof.

Sensing device 455 includes one or more transmitters 456 (hereinafter referred to collectively as "transmitter 456"), and one or more receivers 458 (hereinafter referred to collectively as "receiver 458"). Transmitter 456 is configured to transmit reference signals, synchronization signals, control information and data to one or more other devices, and receiver 458 is configured to receive reference signals, control information and data from one or more other devices. For example, transmitter 456 may transmit signaling, control information and data to, and receiver 458 may receive signaling, control information and data from, UE 115 or network entity 470. In some implementations, transmitter 456 and receiver 458 may be integrated in one or more transceivers. Additionally, or alternatively, transmitter 456 or receiver 458 may include or correspond to one or more components of base station 105 described with reference to FIG. 2.

In some implementations, base station 105 may include one or more antenna arrays. The antenna array may include multiple antenna elements configured to perform wireless communications with other devices, such as with the UE 115. In some implementations, the antenna array may be configured to perform wireless communications using different beams, also referred to as antenna beams. The beams may include TX beams and RX beams. To illustrate, the antenna array may include multiple independent sets (or subsets) of antenna elements (or multiple individual antenna arrays), and each set of antenna elements of the antenna array may be configured to communicate using a different respective beam that may have a different respective direction than the other beams. For example, a first set of antenna elements of the antenna array may be configured to communicate via a first beam having a first direction, and a second set of antenna elements of the antenna array may be configured to communicate via a second beam having a second direction. In other implementations, the antenna array may be configured to communicate via more than two beams. Alternatively, one or more sets of antenna elements of the antenna array may be configured to concurrently generate multiple beams, for example using multiple RF chains of the base station 105. Each individual set (or subset) of antenna elements may include multiple antenna elements, such as two antenna elements, four antenna elements, ten antenna elements, twenty antenna elements, or any other number of antenna elements greater than two. Although described as an antenna array, in other implementations, the antenna array may include or correspond to multiple antenna panels, and each antenna panel may be configured to communicate using a different respective beam.

In some implementations, wireless communications system 400 implements a 5G NR network. For example, wireless communications system 400 may include multiple 5G-capable UEs 115 and multiple 5G-capable base stations 105, such as UEs and base stations configured to operate in accordance with a 5G NR network protocol such as that defined by the 3GPP. In some other implementations, wireless communications system 400 implements a 6G network.

In some implementations, UE 115 or sensing device 415 may be associated with a JCR system. The JCR system provide advantages and benefits of at least helping radar or radar helping communication, spectrum reuse, hardware reuse, or a combination thereof. The JCR system may be categorized as a cooperative JCR system or a co-design of communication and radar systems. In the cooperative JCR system, information may be shared between the communication and radar systems to improve performance, without much altering core operation of radar and communication systems. The cooperative JCR system provides advantages and benefits of at least spectrum reuse and ease of implementation. In the co-design of communication and radar systems, a common transmitter or receiver is used for both communication and radar functionalities. The co-design of communication and radar systems may require modification in the transmit waveform generation or the receiver processing of both or either of the systems. The co-design of communication and radar systems provide advantages and benefits of at least reduced hardware and spectrum reuse.

For NR communications, a charging system may be used that enables online charging. Online charging is a mechanism where charging information can affect, in real-time, the service rendered and therefore a direct interaction of the charging mechanism with the control of network resource usage is required. Online charging may include a process where charging information for network resource usage is collected concurrently with that resource usage in the same fashion as in offline charging. In some implementations, authorization for the network resource usage must be obtained by or from the network prior to the actual resource usage to occur by UE 115. This authorization may be granted by an online charging system (OCS) or a converged charging system (CCS) upon request from the network. In some implementations, the OCS or the CCS may be located at the network, such as base station 105 or core network 130.

The network may receive a network resource usage request and, based on the network resource usage request, assemble the relevant charging information and generate a charging event towards the OCS or CCS. For example, the charging event may be generated in real-time. The OCS or the CCS may then return an appropriate resource usage authorization. The resource usage authorization may be limited in its scope (e.g., volume of data or duration), therefore the authorization may have to be renewed from time to time as long as the user's network resource usage persists.

In some implementations, the charging system may include or use an event-based charging function (EBCF). The EBCF may function within the OCS and may be used to charge events based on an occurrence of an event rather than a duration or a volume used in the event. Examples of an event include are SMS, MMS, or purchase of content (application, game, music, video on demand, etc.). The EBCF may be configured to perform event-based charging and credit-control (e.g. content charging) on a bearer level, on a subsystem level, or on a service level. For example, on the bearer level, the EBCF may perform the event-base charging based on bearer usage requests received from the network such that the EBCF controls the bearer usage in the network, e.g. SMS. As another example, on a subsystem level, the EBCF may perform the event-base charging based on session resource usage requests received from the network (e.g. the IMS MRFC) such that the EBCF controls the resource availability in network, e.g. it has the ability to grant or deny the resource usage. As another example, on service level, the EBCF may perform the event-base charging based on application server requests received from the network (e.g. an IMS application server or MMS relay server) such that the EBCF controls the application service availability in the network, e.g. it has the ability to grant or deny the service usage in the network. The EBCF may communicate with a rating function in order to determine the value of the requested service usage and may communicate with an account balance management function (ABMF) to query and update an account and counters status of a subscriber.

In some implementations, the charging system may include or use a session-based charging function (SBCF). The SBCF may be configured to functions within the OCS. The SBCF may be responsible for online charging of network/user sessions, such as voice calls, IP CAN bearers, IP CAN session or IMS sessions. It is noted that utility services, such as electricity or water, may be charged based on overall usage, for a certain time duration. The SBCF may be configured to perform session based charging and Credit-Control on the bearer level, on the subsystem level, or on the service level. For example, on the bearer level, the SBCF may perform the session-base charging based on bearer usage requests received from the network such that the SBCF controls the bearer usage in the network, e.g. in terms of time or volume granted. As another example, on the subsystem level, the SBCF may perform the session-base charging based on session resource usage requests received from the network (e.g. the IMS CSCF) such that the SBCF controls sessions in the network, e.g. it has the ability to grant or deny a session setup request and to terminate an existing session. As another example, on the service level, the SBCF may perform the session-base charging based on service usage requests received from the network such that the SBCF controls service availability in the network, e.g. it has the ability to grant or deny a usage of a service. The SBCF may communicate with a rating function in order to determine the value of the requested bearer resources or the requested session. Additionally, or alternatively, the SBCF may communicate with an ABMF to query and update an account and counters status of a subscriber.

In some implementations, sensing charging subscription information 409 or 466 is associated with sensing charging subscription for UE 115 or network entity 470 configured to perform bi-static sensing. For example, sensing charging subscription information 409 may include or define the sensing charging subscription, such as a sensing charging subscription model, for UE 115. Additionally, or alternatively, sensing charging subscription information 466 may include or define the sensing charging subscription, such as a sensing charging subscription model, for network entity 470.

In some implementations, network entity 470 is associated with sensing charging subscription information, such as a bi-static sensing charging subscription model for network entity 470. Network entity 470 may be a mobile device or a fixed device. Additionally, or alternatively, network entity 470 is configured to receive a request from another device, such as UE 115, to assist in a bi-static sensing operation. In such situations—e.g., when network entity 470 receives the request to assist, the other device may be referred to as an initiating device and the network entity 470 may be referred to as a helping device.

In some implementations, a controller, such as a centralized controller, may be configured to assist UE 115 to identify or select a helping device. The controller may include or correspond to base station 105, core network 130, LMF 131, a network, or a combination thereof. The controller, such as base station 105, may be configured to request (e.g., ping) one or more devices, such as one or more base station, one or more UEs, one or more network entities, or a combination thereof, for information associated with assisting a bi-static sensing operation. In some implementations, the controller may request capability information, such as capability information 408 or, 465 from the one or more devices. Additionally, or alternative, the controller may request a location of the one or more devices, a mobility of the one or more devices, a type of sensing operation or modes supported by the one or more devices, or a combination thereof. In some implementations, the controller may select at least one device (an assisting device) of the one or more devices as a candidate to assist an initiating device (e.g., UE 115) initiating with the bi-static sensing operation. The controller may select the at least one device as the candidate based on the location of the at least one device, a mobility or direction of travel of the initiating device, a type of sensing request (e.g., a scanning mode request or a tracking mode request), or a combination thereof. In some implementations, the controller may select the at least one device or transmit network entity information that indicates the selected at least one device to UE 115 based on sensing charging subscription information 409 or 466, for a fee charged to UE 115, or a combination thereof. Additionally, or alternatively, based on selection of the at least one device, the controller may signal to the at least one device (e.g. network entity 470) to indicate that the at least one device is selected to participate in a bi-static sensing operation with the initiating device (e.g., UE 115). The controller may also indicate a fee, based on sensing charging subscription information for UE 115 or network entity 470, to be charged for participating in the bi-static sensing operation.

In some implementations, UE 115 and network entity 470 may perform a pre-sensing operation prior to preforming a bi-static sensing operation. To illustrate, the controller may be configured to indicate that a pre-sensing operation is available between UE 115 and network entity 470 to enable UE 115 to determine whether or not network entity 4708 is suitable for bi-static sensing. For example, the controller may indicate that the pre-sensing operation is available for a fee.

In some implementations, UE 115 may perform the bi-static sensing operation with the at least one device (e.g., network entity 470) selected by the controller. For example, the controller may transmit, to UE 115, network entity information that indicates network entity 470 to participate in the bi-static sensing operation. In some implementations, UE 115 and the controller may communicate to determine (or negotiate) a sensing resource, a sensing transmission parameter, a sensing charge fee, or a combination thereof, associated with performing the bi-static sensing operation, using network entity, or a combination thereof.

In some implementations, the controller may support selection of the at least one device by the initiating device (e.g., UE 115) by enabling a pre-sensing mode. The pre-sensing mode may be enabled at the initiating device, the at least one device, or a combination thereof, based on a fee, such as a fee determined based on sensing charging subscription information 409 or 466. Additionally, or alternatively, the pre-sensing mode may enable the initiating device to understand one or more channel conditions between the at least one device and the at least one device. To illustrate, the pre-sensing mode can be for a coarse sensing estimation performance with low resource usage overhead. As another example, the pre-sensing mode can be for a fine sensing estimation performance within a short duration. In some implementations, the at least one device may generate a pre-sensing measurement report based on a pre-sensing operation. A fee may be charged to the initiating device, the at least one device, or both, based on a Tx parameter or a resource needed for the pre-sensing mode. For example, a first fee may be charged to the initiating device (as a Tx node) and a second fee may be charged to the at least one device (as an Rx node). Additionally, or alternatively, the pre-sensing measurement report may be generated or communicated to the initiating device, the controller, or to another device, for a fee. For example, the at least one device may generate and send the pre-sensing measurement report to the controller. The pre-sensing measurement report may include or indicate a channel quality, an amount of interference, a signal strength, or a combination thereof, as illustrative, non-limiting examples. The controller may send pre-sensing measurement report tot one or more other device or may use the pre-sensing measurement report to select a device for the initiating device to use in the bi-static sensing operation. As another example, the at least one device may generate and send the pre-sensing measurement report to the initiating device. The initiating wireless may decide, based on the measurement report, if modification of resources, transmission parameters, or a different device is needed for the bi-static sensing operation. In some implementations, no pre-sensing measurement report will be offered or enabled by the controller.

In some implementations, the controller is configured to determine a fee (for the initiating device or the assisting device) based on a resource available at the assisting device, a resource needed for the bi-static sensing operation by the initiating device, or a combination thereof. For example, the fee may be a fixed sensing fee to perform or support a bi-static sensing operation. As another example, if a fraction (e.g., a portion) of a resource needed by the initiating device (with respect to a total available resource) is close to 100%, the controller may deny the sensing service or charge an additional fee (in addition to a standard fee for the sensing service). Additionally, or alternatively, the controller may be configured to determine a fee (for the initiating device or the assisting device) based on a location or mobility of the initiating device, the assisting device, or a combination thereof. For example, if the initiating device is greater than or equal to a threshold distance from the assisting device, or the devices are traveling in different direction, the controller may deny the sensing service. Additionally, or alternatively, the controller may be configured to determine a fee (for the initiating device or the assisting device) based on a mode (e.g., a Tx mode or an Rx mode) of the assisting device. For example, the assigning device operating in the Tx mode can incur a higher fee than the assisting device operating in the Rx mode, such as due to active transmission required by the assisting device. In some implementations, the controller may also be configured to determine a fee (for the initiating device or the assisting device) based on an additional service request, such as a pre-sensing mode, a type of measurement report (e.g., a pre-sensing measurement report with the assisting device as a Rx node, a pre-sensing measurement report with the assisting device as a Tx node, a frequency of a pre-sensing measurement report), or a combination thereof.

In some implementations, the controller enables the selection of an assisting device, such as for a given sensing subscription fee. The selection may be based on a subscription charge fee for different Tx and Rx modes of the assisting device, a subscription package of the initiating device, a sensing QoS request from the initiating device, a predicted sensing QoS offered by assisting device, or a combination thereof.

In some implementations, the initiating device is configured to perform the bi-static sensing with the assisting device selected and agreed upon with the controller. Additionally, the initiating device may communicate with the controller to determine or negotiate a sensing resource, a sensing transmission parameter, sensing charge fee, or a combination thereof. Additionally, or alternatively, the initiating device and the assisting device may communicate to determine whether or not a sensing QoS need of the initiating device and the sensing charge fee of the assisting device are agreed, or if the sensing service is denied.

In some implementations, a handover of the assisting device is performed for assisting the initiating device with improved sensing performance. For example, the controller may enable a handover of the assisting device for an additional charge to the initiating device or the assisting device. As another example, the controller or a service base station (e.g., 105) may send a sensing measurement report, such as a pre-sensing measurement report, or a Tx/Rx configuration to another base station for an additional fee. As another example, the controller or a serving base station (e.g., 150) may send a sensing measurement report, such as a pre-sensing measurement report, or a Tx/Rx configuration to the future assisting device within a coverage area of the base station for a fee. In some implementations, a handover of the assisting device may be based on a predicted location or mobility of one or more surrounding base stations, one or more surrounding UEs or network entities, or a combination thereof.

Figure 5:
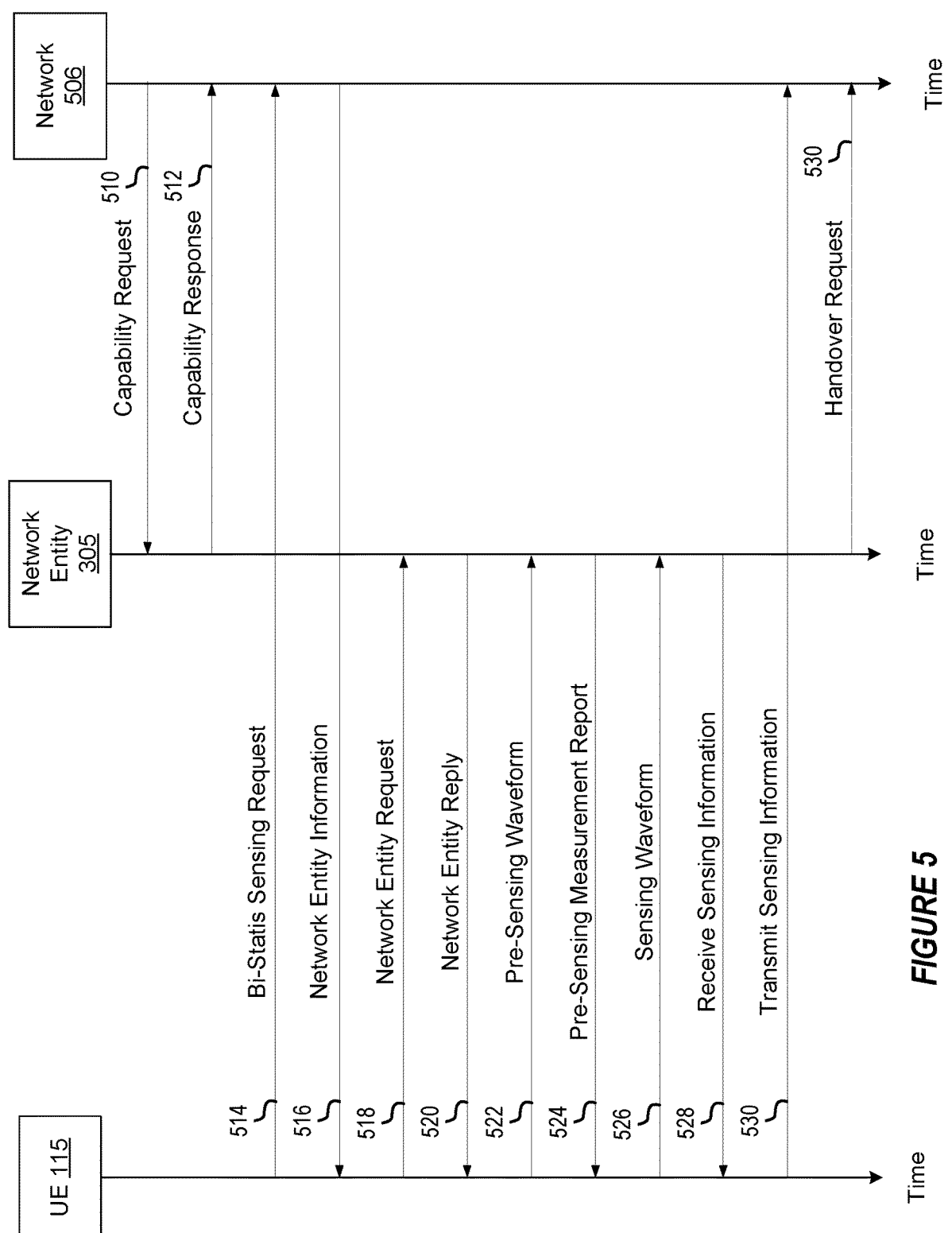
FIG. 5 is a ladder diagram illustrating an example of operations that supports a sensing charging subscription according to one or more aspects.

An illustrative operation of wireless communications system 400 is described at least with reference to FIG. 5. FIG. 5 is a ladder diagram illustrating an example of operations that supports a sensing charging subscription according to one or more aspects. As shown in FIG. 5, a system of the ladder diagram includes UE 115, a network entity 470, and a network 430. Network 506 may include or correspond to base station 105 or core network 130. Although shown and described as being a single entity, in some implementations, network 506 may be a distributed server system. UE 115, network entity 470, and network 506 may include one or more components and be configured to perform one or more operations, as described with reference to FIGS. 1-4.

During operation, at 510, network 506 may transmit a capability request. The capability request may include a request for capability information associated with an availability of a device, such as UE 115 or network entity 470, to participate in one or bistatic sensing operations. The capability request may be received by network entity 470. In some implementations, the capability request may additionally or alternatively be received by UE 115.

At 512, in response to the request, network entity transmits a capability response to network 506. The capability response may include or indicate information 406, capability information 408, information 464, capability information 465, or information 484. The capability response may include capability information of network entity 470, UE 115, or a combination thereof. In some implementations, UE 115 may transmit a capability response to network 506. Network 506 may identify one or more network entities available to participate in bi-static sensing operations based on one or more capability responses received by network 506 from one or more network entities.

At 514, UE 115, such as an initiating device, transmits a bi-static sensing request. For example, UE 115 may transmit the bi-static sensing request to network 506. The bi-static sensing request may include or indicate a request to perform the bi-static sensing operation, such as a request for UE 115 to perform or initiate the bi-static sensing operation.

At 516, network 506 may transmit network entity information. To illustrate, network 506 may transmit the network entity information response to the bi-static sensing request. UE 115, network entity 470, or both may receive the network entity information. The network entity information may indicate at least one network entity, such as network entity 470, selected from one or more network entities available to participate in the bi-static sensing operation. In some implementations, network 506 selects (for inclusion in the network entity information) network entity 470 from one or more entities available to participate in the bi-static sensing operation. For example, network entity 470 may be selected from the one or more network entities based on a location of the network entity, a location of the UE, capability information received from the network entity, a fee for use of the network entity, sensing charging subscription information associated with the UE, a quality of service requested by the UE, an available quality of service associated with the network entity, or a combination thereof.

At 518, UE 115 transmits a network entity request to network entity 470. The network entity request may include a request for network entity 470 to participate in a bi-static sensing operation. In some implementations, UE 115 may identify network entity 470, send the network entity request, or both, based on the network entity information received from network 506. At 520, network entity 470 may transmit a network entity reply to UE 115. The network entity reply may be response to the network entity request and may indicate whether or not network entity 470 is able to or will participate in the bi-static sensing operation. The network entity information may indicate a sensing resource (e.g., a channel), a sensing transmission parameter (e.g., a transmit power, a beam bandwidth, a beam direction, a quality of service), a sensing charge fee (e.g., for a pre-sensing operation, the bi-static sensing operation, use of network entity 470), or a combination thereof.

At 522, UE transmits a pre-sensing waveform. The pre-sensing waveform may be transmitted as part of a pre-sensing operation prior to the bi-static sensing operation. UE 115 may determine to perform the pre-sensing operation based on the network entity information, the network entity reply, or a combination thereof. In some implementations, the pre-sensing operation is associated with a course sensing estimation or a fine sensing estimation, performed via a UL channel, or a combination thereof. At 524, network entity 470 transmits (and UE 115 receives) a pre-sensing measurement report. In some implementations, network 506 may additionally, or alternatively, receive the pre-sensing measurement report from network entity 470. UE 115 may determine whether or not to perform the bi-static sensing operation with network entity 470 based on the pre-sensing measurement report, a quality of service of UE 115, a sensing charge fee associated with network entity 470, or a combination thereof. In some implementations, UE 115 may perform a pre-sensing operation with one or more network entities and select one network entity (of the one or more network entities) for the bi-static sensing operation based on one or more pre-sensing operation results.

At 526, UE 115 transmits a sensing waveform. For example, UE 115 may initiate or perform the bi-static sensing operation with network entity 470, and the bi-static sensing operation includes UE 115 transmitting the sensing waveform that is receive by network entity 470. In some implementations, the sensing waveform received by network entity 470 may include a reflection of the sensing waveform off of an object, such as object 490.

At 528, network entity 470 may transmit receive sensing information. For example, network entity 470 may generate the receive sensing information based on receipt of the sensing waveform—e.g., the receive sensing information is associated with the bi-static sensing operation. The receive sensing information may include, indicate, or correspond to information 406, measurement information 410, or information 484. Although the receive sensing information is shown as being transmitted to UE 115, in other implementation, the receive sensing information may additionally or alternatively be transmitted to network 506.

At 530, UE 115 transmits transmit sensing information. For example, UE 115 may generate the transmit sensing information based on transmission of the sensing waveform —e.g., the transmit sensing information may be associated with the bi-static sensing operation. Although the transmit sensing information is shown as being transmitted to network 506, in other implementation, the receive sensing information may additionally or alternatively be transmitted to network entity 470. In some implementations, the transmit sensing information may indicate completion of the bi-static sensing operation, the receive sensing information, the network entity, a time domain parameter, a frequency domain parameter, a beam direction, a beam bandwidth, a transmission power, a quality of service, or a combination thereof.

In some implementations, after receiving the receive sensing information, the transmit sensing information, or a combination thereof, network 506 may determine a fee associated with the bi-static sensing request, the pre-sensing operation, the bi-static sensing operation, or a combination thereof. The fee may include or correspond to sensing charge 467. Additionally, or alternatively, the fee may be determined based on sensing charging subscription information associated with UE 115, network entity 470, or a combination thereof. For example, the sensing charging subscription information may include or correspond to information 406, sensing charging subscription information 409, information 484, information 464, or sensing charging subscription information 466. Additionally, or alternatively, network 506 may determine the fee for the bi-static sensing operation based on the transmit sensing information, the receive sensing information, a resource available at network entity 470 for the bi-static sensing operation, a resource needed by UE 115 for the bi-static sensing operation, a location of UE 115, a mobility of UE 115, a location of network entity 470, a mobility of network entity 470, a distance between UE 115 and network entity 470, an operational mode at network entity 470, a pre-sensing operation, a pre-sensing measurement report, or a combination thereof. In some implementations, network 506 may determine the fee as a fixed sensing fee for the bi-static sensing operation performed by UE 115. The sensing charging subscription information indicates a functionality, a rule, a profile, or a combination thereof.

In some implementations, network 506 may determine a first fee for network entity 470 as a receive (Rx) device, a second fee for UE 115 as a transmit (Tx) device, or a combination thereof. For example, network 506 may determine the first fee or the second fee is determined based on a pre-sensing operation, a Tx parameter, a resource, a quality of service, or a combination thereof.

At 530, network entity 470 transmits a handover request 532 to network 506. The handover request may be associated with assisting UE 115 with the bi-static sensing operation. Based on the handover request, network 506 may send a pre-sensing message report or configuration information (e.g., network entity information) to a base station (e.g., 105), send a pre-sensing message report or configuration information (e.g., network entity information) to another network entity, or perform the handover operation based on a predicted location or mobility of one or more base stations, one or more UEs, or a combination thereof. The transmit sensing information may indicate completion of the bi-static sensing operation, the receive sensing information, the network entity, a time domain parameter, a frequency domain parameter, a beam direction, a beam bandwidth, a transmission power, a quality of service, or a combination thereof.

It is noted that although operations of FIG. 5 are described in a particular order, such order is not intended to be limited. Accordingly, one or more operations described with reference to FIG. 5 may be performed in an order other than what is shown and described with reference to FIG. 5.

As described with reference to FIGS. 4 and 5, the present disclosure provides techniques for supporting a sensing charging subscription. The techniques described provide processes, information, and signaling for UE 115 to perform sensing operations, such as a bi-static sensing operation, according to a sensing subscription. Wireless network 100 may advantageously manage sensing-based subscription charges for the sensing operations or services, such as 5G or NR sensing services, associated with UE 115. Additionally, the techniques described herein enable sensing operations performed by UE 115 may be managed or controlled according to the sensing subscriptions. By managing and controlling the sensing operations performed by UE 115, the techniques described herein enable reduced overhead, efficient spectrum usage, improved spectrum reuse, reduced device hardware, improved hardware reuse, or a combination thereof.

FIG. 6 is a flow diagram illustrating an example process 600 that supports a sensing charging subscription according to one or more aspects. Operations of process 600 may be performed by a UE, such as UE 115 described above with reference to FIGS. 1-5 or a UE described with reference to FIG. 7. For example, example operations (also referred to as "blocks") of process 600 may enable UE 115 to support a sensing charging subscription.

In block 602, the UE transmits a request to a network entity to participate in a bi-static sensing operation. For example, the network entity may include or correspond to network entity 470. The request may include or correspond to the bi-static sensing request transmitted by UE 115 as described at 514 of FIG. 5.

In block 604, the UE performs the bi-static sensing operation with the network entity. The bi-static sensing operation may include or correspond to the sensing waveform transmitted by UE 115 as described at 526 of FIG. 5.

In block 606, the UE transmits transmit sensing information associated with the bi-static sensing operation. For example, the transmit sensing information may include or correspond to information 406, measurement information 410, information 464, or information 484. As another example, the transmit sensing information may include or correspond to the transmit sensing information transmitted by UE 115 at 530 of FIG. 5. The transmit sensing information may be associated with sensing charging subscription information. The sensing charging subscription information may include or correspond to information 406, sensing charging subscription information 409, information 464, sensing charging subscription information 466, or information 484. The sensing charging subscription information may include or indicate a functionality, a rule, a profile, or a combination thereof.

In some implementations, the UE receives receive sensing information associated with the bi-static sensing operation from the network entity. The receive sensing information may include or correspond to information 406, measurement information 410, information 484, or information 464. Additionally, or alternatively, the receiving sensing information may include or correspond to the receive sensing information transmitted by network entity 470 at 528 of FIG. 5. The transmit sensing information may indicate completion of the bi-static sensing operation, the receive sensing information, the network entity, a time domain parameter, a frequency domain parameter, a beam direction, a beam bandwidth, a transmission power, a quality of service, or a combination thereof.

In some implementations, the UE transmits, to a network, a request to perform the bi-static sensing operation. The network may include or correspond to base station 105, core network 130, or network 506. The request to perform the bi-static sensing operation may include or correspond to bi-static sensing request transmitted by UE 115 at 514 of FIG. 5. Additionally, or alternatively, the UE may receive network entity information from the network. For example, the network entity information may include or correspond to network entity information received by UE 115 at 516 of FIG. 5. The network entity information may indicate the network entity selected from one or more network entities available to participate in the bi-static sensing operation. Additionally, or alternatively, the network entity information indicates a sensing resource, a sensing transmission parameter, a sensing charge fee, or a combination thereof. the network entity includes a base station, a roadside unit, or another UE, the network entity is a mobile device or a stationary device, the network includes a core network, or a combination thereof.

In some implementations, the UE performs a pre-sensing operation with the network entity prior to performing the bi-static sensing operation. For example, the pre-sensing operation may include or correspond to the pre-sensing waveform transmitted by UE 115 at 522 of FIG. 5. The pre-sensing operation is associated with a course sensing estimation or a fine sensing estimation, performed via an uplink (UL) channel, or a combination thereof. Additionally, or alternatively, the UE may receive, from the network entity, a pre-sensing measurement report from the network entity. For example, the pre-sensing measurement report may include or correspond to the pre-sensing measurement report transmitted by network entity 470 524 of FIG. 5. In some implementations, the UE may determine whether or not to perform the bi-static sensing operation based on the pre-sensing measurement report, a quality of service of the UE, a sensing charge fee associated with the network entity, or a combination thereof.

In some implementations, the UE receives, from a network, a request for capability information associated with an availability of the UE to participate in one or bistatic sensing operations. The request may include or correspond to the capability request transmitted by network 506 at 510 of FIG. 5. In response to the request, the UE may transmit UE capability information to the network. The UE capability information may include or correspond to information 406, capability information 408, information 484, information 464, or capability information 465. As another example, the UE capability information may include or correspond to the capability response received by network 506 at 512 of FIG. 5.

FIG. 7 is a block diagram of an example UE 700 that supports a sensing charging subscription according to one or more aspects. UE 700 may be configured to perform operations, including the blocks of a process described with reference to FIG. 6. In some implementations, UE 700 includes the structure, hardware, and components shown and described with reference to UE 115 of FIGS. 1-5. For example, UE 700 includes controller 280, which operates to execute logic or computer instructions stored in memory 282, as well as controlling the components of UE 700 that provide the features and functionality of UE 700. UE 700, under control of controller 280, transmits and receives signals via wireless radios 701a-r and antennas 252a-r. Wireless radios 701a-r include various components and hardware, as illustrated in FIG. 2 for UE 115, including modulator and demodulators 254a-r, MIMO detector 256, receive processor 258, transmit processor 264, and TX MIMO processor 266.

Figure 10:
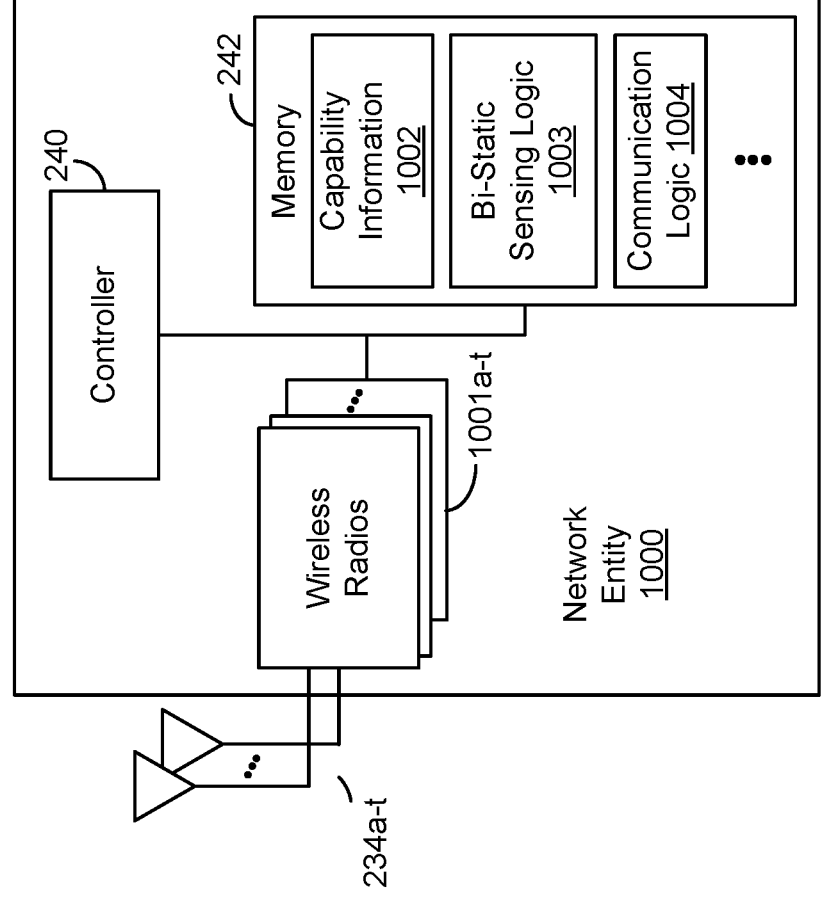
FIG. 10 is a block diagram of an example base station that supports a sensing charging subscription according to one or more aspects.

As shown, memory 282 may include bi-static sensing logic 702 and communication logic 703. Bi-static sensing logic 702 may be configured to enable one or more bi-static sensing operations. Communication logic 703 may be configured to enable communication between UE 700 and one or more other devices. UE 700 may receive signals from or transmit signals to one or more network entities, such as base station 105 of FIGS. 1-4, network entity 470 of FIGS. 4-5, or a network entity as illustrated in FIG. 10.

FIG. 8 is a flow diagram illustrating an example process 800 that supports a sensing charging subscription according to one or more aspects. Operations of process 800 may be performed by a network entity, such as UE 115 described above with reference to FIGS. 1-5, network entity 470 described above with reference to FIGS. 1-5 or base station 105 described above with reference to FIGS. 1-4, UE 700 described above with reference to FIG. 7, or a network entity as described above with reference to FIG. 10. For example, example operations of process 800 may enable the network entity to support a sensing charging subscription.

At block 802, the network entity receives, from a UE, a request to assist the UE in a bi-static sensing operation. For example, the request may include or correspond to the bi-static sensing request received by network entity 470 as described at 514 of FIG. 5.

In some implementations, the network entity transmits, responsive to the request, a response that indicates an availability to participate in the bi-static sensing operation. For example, the response may include or correspond to the network entity reply transmitted by network entity 470 at 520 of FIG. 5.

At block 804, the network entity performs the bi-static sensing operation with the UE. The bi-static sensing operation may include or correspond to the sensing waveform transmitted by UE 115 and received by network entity 470 as described at 526 of FIG. 5.

At block 806, the network entity transmits receive sensing information associated with the bi-static sensing operation. For example, the receive sensing information may include or correspond to information 406, measurement information 410, information 464, or information 484. As another example, the receive sensing information may include or correspond to the receive sensing information transmitted by network entity 470 at 528 of FIG. 5. The receive sensing information may be associated with sensing charging subscription information. The sensing charging subscription information may include or correspond to information 406, sensing charging subscription information 409, information 464, sensing charging subscription information 466, or information 484.

In some implementations, the network entity receives, from a network, a request for capability information associated with an availability of the network entity to participate in one or bistatic sensing operations. The network may include or correspond to base station 105, core network 130, or network 506. The request may include or correspond to the capability request transmitted by network 506 at 510 of FIG. 5. Additionally, or alternatively, the network entity may transmit capability information to the network. The capability information may include or correspond to information 406, capability information 408, information 484, information 464, or capability information 465. As another example, the capability information may include or correspond to the capability response received by network 506 at 512 of FIG. 5.

In some implementations, the network entity performs a pre-sensing operation with the UE. For example, the pre-sensing operation may include or correspond to the pre-sensing waveform transmitted by UE 115 at 522 of FIG. 5. The pre-sensing operation may be associated with a course sensing estimation, a fine sensing estimation, a pre-sensing operation is performed using an UL channel of the UE. Additionally, or alternatively, the network entity may transmit a pre-sensing measurement report based on the pre-sensing operation to a network or the UE. The pre-sensing measurement report may include or correspond to the pre-sensing measurement report transmitted by network entity 470 at 524 of FIG. 5, information 406, measurement information 410, information 484, or information 464.

In some implementations, the network entity initiates, with a network, a handover operation associated with assisting the UE with the bi-static sensing operation. To illustrate, to initiate the handover operation, network entity 470 transmits the handover request at 532 of FIG. 5.

FIG. 9 is a flow diagram illustrating an example process 900 that supports a sensing charging subscription according to one or more aspects. Operations of process 900 may be performed by a network, such as network entity 470 described above with reference to FIGS. 1-5, base station 105 or core network 130 described above with reference to FIGS. 1-4, network 506 described above with reference to FIG. 5, or a network entity as described above with reference to FIG. 10. For example, example operations of process 900 may enable the network entity to support a sensing charging subscription At block 902, the network transmits, to a network entity, a request for capability information associated with an availability of the network entity to participate in one or more bistatic sensing operations. For example, the network entity may include or correspond to UE 115 or network entity 470. The request for the capability information may include or correspond to the capability request transmitted by network 506 at 510 of FIG. 5. The capability information may include or correspond to information 406, capability information 408, information 464, capability information 465, or information 484. Additionally, the capability information may include or correspond to capability response transmitted by network entity 470 at 512 of FIG. 5.

At block 904, the network receives, from a UE, a request to assist the UE in a bi-static sensing operation. For example, the UE may include or correspond to UE 115. The request to assist may include or correspond to the bi-static sensing request received by network 506 at 514 of FIG. 5.

At block 906, the network transmits network entity information to the UE. For example, the network entity information may include or correspond to the network entity information transmitted by network 506 at 516 of FIG. 5. The network entity information may indicate the network entity selected from one or more network entities available to participate in the bi-static sensing operation. In some implementations, the network entity information indicates a sensing resource, a sensing transmission parameter, a sensing charge fee, or a combination thereof. the network entity information is transmitted to the UE, the network entity, or a combination thereof.

In some implementations, the network selects the network entity of the one or more network entities available to participate in the bi-static sensing operation. The network entity may be selected from the one or more network entities based on a location of the network entity, a location of the UE, capability information received from the network entity, a fee for use of the network entity, sensing charging subscription information associated with the UE, a quality of service requested by the UE, an available quality of service associated with the network entity, or a combination thereof.

In some implementations, the network receives transmit sensing information based on the bi-static sensing operation from the UE. For example, the transmit sensing information may include or correspond to information 406, measurement information 410, information 464, or information 484. As another example, the transmit sensing information may include or correspond to the transmit sensing information transmitted by UE 115 at 530 of FIG. 5. Additionally, or alternatively, the network may receive receive sensing information based on the bi-static sensing operation from the network entity. For example, the receive sensing information may include or correspond to information 406, measurement information 410, information 464, or information 484. As another example, the receive sensing information may include or correspond to the receive sensing information transmitted by network entity 470 at 528 of FIG. 5. In some implementations, the network determines, for the UE, a fee for the bi-static sensing operation. For example, the fee may include or correspond to sensing charge 467. The fee may be determined based on sensing charging subscription information (e.g., 409 or 466) associated with the UE and the transmit sensing information, the receive sending information, or a combination thereof. Additionally, or alternatively, the fee for the bi-static sensing operation may be determined based on the transmit sensing information, the receive sensing information, a resource available at the network entity for the bi-static sensing operation, a resource needed by the UE for the bi-static sensing operation, a location of the UE, a mobility of the UE, a location of the network entity, a mobility of the network entity, a distance between the UE and the network entity, an operational mode at the network entity, a pre-sensing operation, a pre-sensing measurement report, or a combination thereof. In some implementations, the network determines, for the UE, a fixed sensing fee for the bi-static sensing operation performed by the UE.

In some implementations, the network receives a pre-sensing measurement report from the network entity. The pre-sensing measurement report may include or correspond to the pre-sensing measurement report transmitted by network entity 470 at 524 of FIG. 5, information 406, measurement information 410, information 484, or information 464. The pre-sensing measurement report may be based on a pre-sensing operation between the UE and the network entity. For example, the pre-sensing operation may include or correspond to the pre-sensing waveform transmitted by UE 115 at 522 of FIG. 5. Additionally, or alternatively, it is noted that the network entity information may indicate that the network entity is available for the pre-sensing operation prior to the bi-static sensing operation. In some implementations, the network determines a first fee for the network entity as an Rx device, a second fee for the UE as a Tx device, or a combination thereof. The first fee or the second fee may be determined based on a pre-sensing operation, a Tx parameter, a resource, a quality of service, or a combination thereof.

In some implementations, the network receives, from the network entity, a request for a handover operation. To illustrate, network entity 470 transmits the handover request to network 506 at 532 of FIG. 5. Based on the request for the handover operation, the network may send a pre-sensing message report or configuration information to a base station, send a pre-sensing message report or configuration information to another network entity, or perform the handover operation based on a predicted location or mobility of one or more base stations, one or more UEs, or a combination thereof.

FIG. 10 is a block diagram of an example network entity 1000 that supports a sensing charging subscription according to one or more aspects. Network entity 1000 may be configured to perform operations, including the blocks of processes described with reference to FIG. 8 or 9. In some implementations, network entity 1000 includes the structure, hardware, and components shown and described with reference to base station 105 of FIGS. 1-4, network entity 470 of FIGS. 1-5, core network 130 of FIGS. 1-4, network 506 of FIG. 5. For example, network entity 1000 may include controller 240, which operates to execute logic or computer instructions stored in memory 242, as well as controlling the components of network entity 1000 that provide the features and functionality of network entity 1000. Network entity 1000, under control of controller 240, transmits and receives signals via wireless radios 1001*a-t* and antennas 234*a-t*. Wireless radios 1001*a-t* include various components and hardware, as illustrated in FIG. 2 for base station 105, including modulator and demodulators 232*a-t*, transmit processor 220, TX MIMO processor 230, MIMO detector 236, and receive processor 238.

As shown, the memory 242 may include capability information 1002, bi-static sensing logic 1003, and communication logic 1004. Capability information 1002 may include or correspond to information 406, capability information 408, information 484, information 464, or capability information 465. Bi-static sensing logic 1003 may be configured to enable one or more bi-static sensing operations. Communication logic 1004 may be configured to enable communication between network entity 1000 and one or more other devices. Network entity 1000 may receive signals from or transmit signals to one or more UEs, such as UE 115 of FIGS. 1-5, network entity 470 of FIGS. 4-5, or UE 700 of FIG. 6.

It is noted that one or more blocks (or operations) described with reference to FIG. 6, 8, or 9 may be combined with one or more blocks (or operations) described with reference to another of the figures. For example, one or more blocks (or operations) of FIG. 6 may be combined with one or more blocks (or operations) of FIG. 8. As another example, one or more blocks associated with FIG. 6 may be combined with one or more blocks associated with FIG. 9. As another example, one or more blocks associated with FIG. 8 may be combined with one or more blocks associated with FIG. 9. As another example, one or more blocks associated with FIG. 6, 8, or 9 may be combined with one or more blocks (or operations) associated with FIGS. 1-5. Additionally, or alternatively, one or more operations described above with reference to FIGS. 1-5 may be combined with one or more operations described with reference to FIG. 7 or 10.

In one or more aspects, techniques for supporting receive sensing information may include additional aspects, such as any single aspect or any combination of aspects described below or in connection with one or more other processes or devices described elsewhere herein. In a first aspect, techniques for supporting receive sensing information may include transmitting a request to a network entity to participate in a bi-static sensing operation. The techniques may further include performing the bi-static sensing operation with the network entity. The techniques may also include transmitting transmit sensing information associated with the bi-static sensing operation. The transmit sensing information may be associated with sensing charging subscription information. In some examples, the techniques in the first aspect may be implemented in a method or process. In some other examples, the techniques of the first aspect may be implemented in a wireless communication device, which may include a UE or a component of a UE. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a second aspect, in combination with the first aspect, the techniques further include receiving receive sensing information associated with the bi-static sensing operation from the network entity.

In a third aspect, in combination with the second aspect, the transmit sensing information indicates completion of the bi-static sensing operation, the receive sensing information, the network entity, a time domain parameter, a frequency domain parameter, a beam direction, a beam bandwidth, a transmission power, a quality of service, or a combination thereof.

In a fourth aspect, in combination with one or more of the first aspect through the third aspect, the sensing charging subscription information indicates a functionality, a rule, a profile, or a combination thereof.

In a fifth aspect, in combination with one or more of the first aspect through the fourth aspect, the techniques further include transmitting, to a network, a request to perform the bi-static sensing operation.

In a sixth aspect, in combination with one or more of the first aspect through the fifth aspect. the techniques further include receiving network entity information from the network. The network entity information of the sixth aspect may indicate the network entity selected from one or more network entities available to participate in the bi-static sensing operation.

In a seventh aspect, in combination with one or more of the first aspect through the sixth aspect, the network entity information indicates a sensing resource, a sensing transmission parameter, a sensing charge fee, or a combination thereof.

In an eighth aspect, in combination with one or more of the first aspect through the seventh aspect, the network entity includes a base station, a roadside unit, or another UE.

In a ninth aspect, in combination with one or more of the first aspect through the eighth aspect, the network entity is a mobile device or a stationary device.

In a tenth aspect, in combination with one or more of the first aspect through the ninth aspect, the network includes a core network.

In an eleventh aspect, in combination with one or more of the first aspect through the tenth aspect, the techniques further include performing a pre-sensing operation with the network entity prior to performing the bi-static sensing operation.

In a twelfth aspect, in combination with the eleventh aspect, the pre-sensing operation is associated with a course sensing estimation or a fine sensing estimation, performed via a UL channel, or a combination thereof.

In a thirteenth aspect, in combination with the eleventh aspect or the twelfth aspect, the techniques further include receiving, from the network entity, a pre-sensing measurement report from the network entity.

In a fourteenth aspect, in combination with the thirteenth aspect, the techniques further include determining whether to perform the bi-static sensing operation based on the pre-sensing measurement report, a quality of service of the UE, a sensing charge fee associated with the network entity, or a combination thereof.

In a fifteenth aspect, in combination with one or more of the first aspect through the fourteenth aspect, the techniques further include receiving, from a network, a request for capability information associated with an availability of the UE to participate in one or bistatic sensing operations.

In a sixteenth aspect, in combination with the sixteenth aspect, the techniques further include, in response to the request, transmitting UE capability information to the network.

In one or more aspects, techniques for supporting receive sensing information may include additional aspects, such as any single aspect or any combination of aspects described below or in connection with one or more other processes or devices described elsewhere herein. In a seventeenth aspect, techniques for supporting receive sensing information may include receiving, from a UE, a request to assist the UE in a bi-static sensing operation. The techniques may further include performing the bi-static sensing operation with the UE. The techniques may also include transmitting receive sensing information associated with the bi-static sensing operation. In some examples, the techniques in the seventeenth aspect may be implemented in a method or process. In some other examples, the techniques of the seventeenth aspect may be implemented in a wireless communication device, such as network entity, which may include a base station or a component of a base station, a UE or a component of a UE, a roadside unit or a component of a roadside unit. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In an eighteenth aspect, in combination with the seventeenth aspect, the techniques further include receiving, from a network, a request for capability information associated with an availability of the network entity to participate in one or bistatic sensing operations.

In a nineteenth aspect, in combination with one or more of the seventeenth aspect or the eighteenth aspect, the techniques further include transmitting capability information to the network.

In a twentieth aspect, in combination with one or more of the seventeenth aspect through the nineteenth aspect, the techniques further include transmitting, responsive to the request, a response that indicates an availability to participate in the bi-static sensing operation.

In a twenty-first aspect, in combination with one or more of the seventeenth aspect through the twentieth aspect, the techniques further include performing a pre-sensing operation with the UE.

In a twenty-second aspect, in combination with the twenty-first aspect, the pre-sensing operation is associated with a course sensing estimation, a fine sensing estimation, a pre-sensing operation is performed using an UL channel of the UE.

In a twenty-third aspect, in combination with the twenty-first aspect or the twenty-second aspect, the techniques further include transmitting a pre-sensing measurement report based on the pre-sensing operation to a network or the UE.

In a twenty-fourth aspect, in combination with one or more of the seventeenth aspect through the twenty-third aspect, the techniques further include initiating, with a network, a handover operation associated with assisting the UE with the bi-static sensing operation.

In one or more aspects, techniques for supporting receive sensing information may include additional aspects, such as any single aspect or any combination of aspects described below or in connection with one or more other processes or devices described elsewhere herein. In a twenty-fifth aspect, techniques for supporting receive sensing information may include transmitting, to a network entity, a request for capability information associated with an availability of the network entity to participate in one or bistatic sensing operations. The techniques may further include receiving, from a UE, a request to assist the UE in a bi-static sensing operation. The techniques may also include transmitting network entity information to the UE. The network entity information indicates the network entity selected from one or more network entities available to participate in the bi-static sensing operation. In some examples, the techniques in the twenty-fifth aspect may be implemented in a method or process. In some other examples, the techniques of the twenty-fifth aspect may be implemented in a wireless communication device, such as network entity, which may include a base station or a component of a base station, a network or core network, or a component of a network or core network. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein. Additionally, or alternatively, the wireless communication device may include an interface (e.g., a wireless communication interface) that includes a transmitter, a receiver, or a combination thereof. Additionally, or alternatively, the wireless communication device may include one or more means configured to perform operations described herein.

In a twenty-sixth aspect, in combination with the twenty-fifth aspect, the techniques further include selecting the network entity of the one or more network entities available to participate in the bi-static sensing operation.

In a twenty-seventh aspect, in combination with the twenty-sixth aspect, the network entity is selected from the one or more network entities based on a location of the network entity, a location of the UE, capability information received from the network entity, a fee for use of the network entity, sensing charging subscription information associated with the UE, a quality of service requested by the UE, an available quality of service associated with the network entity, or a combination thereof.

In a twenty-eighth aspect, in combination with one or more of the twenty-fifth aspect through the twenty-seventh aspect, the techniques further include receiving transmit sensing information based on the bi-static sensing operation from the UE.

In a twenty-ninth aspect, in combination with one or more of the twenty-fifth aspect through the twenty-eighth aspect, the techniques further include receive, from the network entity, sensing information based on the bi-static sensing operation.

In a thirtieth aspect, in combination with one or more of the twenty-fifth aspect through the twenty-ninth aspect, the techniques further include determining, for the UE, a fee for the bi-static sensing operation.

In a thirty-first aspect, in combination with the thirtieth aspect, the fee is determined based on sensing charging subscription information associated with the UE and the transmit sensing information, the receive sending information, or a combination thereof.

In a thirty-second aspect, in combination with one or more of the twenty-fifth aspect through the thirty-first aspect, the network entity information indicates a sensing resource, a sensing transmission parameter, a sensing charge fee, or a combination thereof.

In a thirty-third aspect, in combination with one or more of the twenty-fifth aspect through the thirty-second aspect, the network entity information is transmitted to the UE, the network entity, or a combination thereof.

In a thirty-fourth aspect, in combination with one or more of the twenty-fifth aspect through the thirty-third aspect, the techniques further include receiving a pre-sensing measurement report from the network entity.

In a thirty-fifth aspect, in combination with the thirty-fourth aspect, the pre-sensing measurement report based on a pre-sensing operation between the UE and the network entity.

In a thirty-sixth aspect, in combination with the thirty-fourth aspect or the thirty-fifth aspect, the network entity information indicates that the network entity is available for the pre-sensing operation prior to the bi-static sensing operation.

In a thirty-seventh aspect, in combination with one or more of the twenty-fifth aspect through the thirty-sixth aspect, the techniques further include determining a first fee for the network entity as an Rx device, a second fee for the UE as a Tx device, or a combination thereof.

In a thirty-eighth aspect, in combination with the thirty-seventh aspect, the first fee or the second fee is determined based on a pre-sensing operation, a Tx parameter, a resource, a quality of service, or a combination thereof.

In a thirty-ninth aspect, in combination with one or more of the twenty-fifth aspect through the thirty-eighth aspect, the techniques further include receiving, based on the bi-static sensing operation, transmit sensing information from the UE, receive sensing information from the network entity, or a combination thereof.

In a fortieth aspect, in combination with the thirty-ninth aspect, the techniques further include determining, for the UE, a fee for the bi-static sensing operation based on the transmit sensing information, the receive sensing information, a resource available at the network entity for the bi-static sensing operation, a resource needed by the UE for the bi-static sensing operation, a location of the UE, a mobility of the UE, a location of the network entity, a mobility of the network entity, a distance between the UE and the network entity, an operational mode at the network entity, a pre-sensing operation, a pre-sensing measurement report, or a combination thereof.

In a forty-first aspect, in combination with one or more of the twenty-fifth aspect through the thirty-eighth aspect, the techniques further include determining, for the UE, a fixed sensing fee for the bi-static sensing operation performed by the UE.

In a forty-second aspect, in combination with one or more of the twenty-fifth aspect through the forty-first aspect, the techniques further include receiving, from the network entity, a request for a handover operation.

In a forty-third aspect, in combination with the forty-second aspect, the techniques further include, based on the request for the handover operation, performing the handover operation based on a predicted location or mobility of one or more base stations, one or more UEs, or a combination thereof.

In a forty-fourth aspect, in combination with the forty-third aspect, the techniques further include, based on the request for the handover operation, sending a pre-sensing message report or configuration information to a base station.

In a forty-fifth aspect, in combination with the forty-fourth aspect, the techniques further include, based on the request for the handover operation, sending a pre-sensing message report or configuration information to another network entity.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-10 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a user equipment (UE), the method comprising:
transmitting a request to a network entity to participate in a bi-static sensing operation;
performing the bi-static sensing operation with the network entity; and
transmitting transmit sensing information associated with the bi-static sensing operation, the transmit sensing information associated with sensing charging subscription information.

2. The method of claim 1, further comprising:
receiving receive sensing information associated with the bi-static sensing operation from the network entity, and
wherein the transmit sensing information indicates completion of the bi-static sensing operation, the receive sensing information, the network entity, a time domain parameter, a frequency domain parameter, a beam direction, a beam bandwidth, a transmission power, a quality of service, or a combination thereof, and
wherein the sensing charging subscription information indicates a functionality, a rule, a profile, or a combination thereof.

3. The method of claim 1, further comprising:
transmitting, to a network, a request to perform the bi-static sensing operation; and
receiving network entity information from the network, the network entity information indicates the network entity selected from one or more network entities available to participate in the bi-static sensing operation.

4. The method of claim 3, wherein:
the network entity information indicates a sensing resource, a sensing transmission parameter, a sensing charge fee, or a combination thereof;
the network entity includes a base station, a roadside unit, or another UE;
the network entity is a mobile device or a stationary device;
the network includes a core network; or
a combination thereof.

5. The method of claim 1, further comprising:
performing a pre-sensing operation with the network entity prior to performing the bi-static sensing operation, and
wherein the pre-sensing operation is associated with a course sensing estimation or a fine sensing estimation, performed via an uplink (UL) channel, or a combination thereof.

6. The method of claim 5, further comprising:
receiving, from the network entity, a pre-sensing measurement report from the network entity; and
determining whether to perform the bi-static sensing operation based on the pre-sensing measurement report, a quality of service of the UE, a sensing charge fee associated with the network entity, or a combination thereof.

7. The method of claim 1, further comprising:
receiving, from a network, a request for capability information associated with an availability of the UE to participate in one or bistatic sensing operations; and
in response to the request, transmitting UE capability information to the network.

8. A user equipment (UE) comprising:
a sensing device configured to be used in a bi-static sensing operation;
a memory storing processor-readable code; and
at least one processor coupled to the memory, the at least one processor configured to execute the processor-readable code to cause the at least one processor to:
transmit a request to a network entity to participate in the bi-static sensing operation;
perform the bi-static sensing operation with the network entity; and
transmit sensing information associated with the bi-static sensing operation, the transmit sensing information associated with sensing charging subscription information.

9. The UE of claim 8, wherein the at least one processor is configured to execute the processor-readable code to cause the at least one processor to:
receive sensing information associated with the bi-static sensing operation from the network entity, and wherein the sensing charging subscription information indicates a functionality, a rule, a profile, or a combination thereof, and wherein the transmit sensing information indicates completion of the bi-static sensing operation, the receive sensing information, the network entity, a time domain parameter, a frequency domain parameter, a beam direction, a beam bandwidth, a transmission power, a quality of service, or a combination thereof.

10. The UE of claim 8, wherein the at least one processor is configured to execute the processor-readable code to cause the at least one processor to:

transmit, to a network, a request to perform the bi-static sensing operation; and receive network entity information from the network, the network entity information indicates the network entity selected from one or more network entities available to participate in the bi-static sensing operation.

11. The UE of claim 10, wherein:

the network entity information indicates a sensing resource, a sensing transmission parameter, a sensing charge fee, or a combination thereof;

the network entity includes a base station, a roadside unit, or another UE;

the network entity is a mobile device or a stationary device;

the network includes a core network; or a combination thereof.

12. The UE of claim 8, wherein:

the at least one processor is configured to execute the processor-readable code to cause the at least one processor to perform a pre-sensing operation with the network entity prior to performing the bi-static sensing operation; and the pre-sensing operation is associated with a course sensing estimation or a fine sensing estimation, performed via an uplink (UL) channel, or a combination thereof.

13. The UE of claim 12, wherein the at least one processor is configured to execute the processor-readable code to cause the at least one processor to:

receive, from the network entity, a pre-sensing measurement report from the network entity; and determine whether to perform the bi-static sensing operation based on the pre-sensing measurement report, a quality of service of the UE, a sensing charge fee associated with the network entity, or a combination thereof.

14. The UE of claim 8, wherein the at least one processor is configured to execute the processor-readable code to cause the at least one processor to:

receive, from a network, a request for capability information associated with an availability of the UE to participate in one or bistatic sensing operations; and in response to the request, transmit UE capability information to the network.

15. A method of wireless communication performed by a network entity, the method comprising:

receiving, from a user equipment (UE), a request to assist the UE in a bi-static sensing operation;

performing the bi-static sensing operation with the UE; and transmitting receive sensing information associated with the bi-static sensing operation, the receive sensing information associated with sensing charging subscription information.

16. The method of claim 15, further comprising:

receiving, from a network, a request for capability information associated with an availability of the network entity to participate in one or bistatic sensing operations; and transmitting capability information to the network.

17. The method of claim 15, further comprising:

transmitting, responsive to the request, a response that indicates an availability to participate in the bi-static sensing operation.

18. The method of claim 15, further comprising:

performing a pre-sensing operation with the UE, and wherein the pre-sensing operation is associated with a course sensing estimation, a fine sensing estimation, a pre-sensing operation is performed using an UL channel of the UE.

19. The method of claim 18, further comprising:

transmitting a pre-sensing measurement report based on the pre-sensing operation to a network or the UE.

20. The method of claim 15, further comprising initiating, with a network, a handover operation associated with assisting the UE with the bi-static sensing operation.

21. A method of wireless communication performed by a network, the method comprising:

transmitting, to a network entity, a request for capability information associated with an availability of the network entity to participate in one or more bistatic sensing operations;

receiving, from a user equipment (UE), a request to assist the UE in a bi-static sensing operation; and transmitting network entity information to the UE, the network entity information indicates the network entity selected from one or more network entities available to participate in the bi-static sensing operation, the bi-static sensing operation associated with sensing charging subscription information.

22. The method of claim 21, further comprising:

selecting the network entity of the one or more network entities available to participate in the bi-static sensing operation.

23. The method of claim 22, wherein the network entity is selected from the one or more network entities based on a location of the network entity, a location of the UE, capability information received from the network entity, a fee for use of the network entity, the sensing charging subscription information associated with the UE, a quality of service requested by the UE, an available quality of service associated with the network entity, or a combination thereof.

24. The method of claim 21, further comprising:

receiving transmit sensing information based on the bi-static sensing operation from the UE, receive sensing information based on the bi-static sensing operation from the network entity, or a combination thereof, and determining, for the UE, a fee for the bi-static sensing operation, the fee determined based on the sensing charging subscription information associated with the UE and the transmit sensing information, the receive sending information, or a combination thereof.

25. The method of claim 21, wherein:

the network entity information indicates a sensing resource, a sensing transmission parameter, a sensing charge fee, or a combination thereof; and the network entity information is transmitted to the UE, the network entity, or a combination thereof.

26. The method of claim 21, further comprising:

receiving a pre-sensing measurement report from the network entity, the pre-sensing measurement report based on a pre-sensing operation between the UE and the network entity, and wherein the network entity information indicates that the network entity is available for the pre-sensing operation prior to the bi-static sensing operation.

27. The method of claim 21, further comprising:

determining a first fee for the network entity as a receive (Rx) device, a second fee for the UE as a transmit (Tx) device, or a combination thereof, and wherein the first fee or the second fee is determined based on a pre-sensing operation, a Tx parameter, a resource, a quality of service, or a combination thereof.

28. The method of claim 21, further comprising:

receiving, based on the bi-static sensing operation, transmit sensing information from the UE, receive sensing information from the network entity, or a combination thereof; and determining, for the UE, a fee for the bi-static sensing operation based on the transmit sensing information, the receive sensing information, a resource available at the network entity for the bi-static sensing operation, a resource needed by the UE for the bi-static sensing operation, a location of the UE, a mobility of the UE, a location of the network entity, a mobility of the network entity, a distance between the UE and the network entity, an operational mode at the network entity, a pre-sensing operation, a pre-sensing measurement report, or a combination thereof.

29. The method of claim 21, further comprising:

determining, for the UE, a fixed sensing fee for the bi-static sensing operation performed by the UE.

30. The method of claim 21, further comprising:

receiving, from the network entity, a request for a handover operation; and based on the request for the handover operation:

performing the handover operation based on a predicted location or mobility of one or more base stations, one or more UEs, or a combination thereof;

sending a pre-sensing message report or configuration information to a base station; or sending a pre-sensing message report or configuration information to another network entity.

\* \* \* \* \*